US012659022B2

(12) United States Patent
Ashworth et al.

(10) Patent No.: US 12,659,022 B2
(45) Date of Patent: Jun. 16, 2026

(54) REPEATER SYSTEM FOR TERRESTRIAL AND NON-TERRESTRIAL SIGNALS

(71) Applicant: Wilson Electronics, LLC, St. George, UT (US)

(72) Inventors: Christopher Ken Ashworth, Toquerville, UT (US); Dale Robert Anderson, Colleyville, TX (US); Ilesh V. Patel, Euless, TX (US)

(73) Assignee: Wilson Electronics, LLC, St. George, UT (US)

( * ) Notice: Subject to any disclaimer, the term of this patent is extended or adjusted under 35 U.S.C. 154(b) by 273 days.

(21) Appl. No.: 18/241,743

(22) Filed: Sep. 1, 2023

(65) Prior Publication Data

US 2024/0088995 A1     Mar. 14, 2024

Related U.S. Application Data

(60) Provisional application No. 63/413,926, filed on Oct. 6, 2022, provisional application No. 63/403,680, filed on Sep. 2, 2022.

(51) Int. Cl.
H04B 7/185          (2006.01)

(52) U.S. Cl.
CPC ..... H04B 7/18534 (2013.01); H04B 7/18513 (2013.01); H04B 7/18517 (2013.01)

(58) Field of Classification Search
CPC ............ H04B 7/18534; H04B 7/18513; H04B 7/18517; H04B 7/15557; H04B 7/15528
USPC ........................................................ 455/430
See application file for complete search history.

(56) References Cited

U.S. PATENT DOCUMENTS

| | | | | | |
|---|---|---|---|---|---|
| 6,108,539 | A | * | 8/2000 | Ray ..................... | H04B 7/18506 |
| | | | | | 455/430 |
| 6,339,611 | B1 | * | 1/2002 | Antonio ............. | H04B 7/18534 |
| | | | | | 370/316 |
| 2003/0008652 | A1 | * | 1/2003 | Jochim .................. | H01Q 1/246 |
| | | | | | 455/430 |
| 2005/0020203 | A1 | * | 1/2005 | Losh .................... | H04B 1/7097 |
| | | | | | 455/431 |
| 2017/0324460 | A1 | * | 11/2017 | Dutta ..................... | H04B 17/24 |
| 2018/0091218 | A1 | * | 3/2018 | Ashworth .......... | H04B 7/18517 |
| 2023/0224863 | A1 | * | 7/2023 | Ji ........................... | H04W 24/08 |
| 2023/0379047 | A1 | * | 11/2023 | Bashir ............... | H04B 7/18517 |

(Continued)

FOREIGN PATENT DOCUMENTS

| | | | | | | |
|---|---|---|---|---|---|---|
| CN | 111492604 | A | * | 8/2020 | ......... | H04B 7/18586 |
| CN | 106797355 | B | * | 9/2020 | ............. | H04B 7/155 |
| KR | 100434886 | B1 | | 6/2004 | | |

(Continued)

*Primary Examiner* — Mahendra R Patel
(74) *Attorney, Agent, or Firm* — Thorpe North & Western, LLP.

(57)          ABSTRACT

A technology is described for a terrestrial and non-terrestrial signal repeater system operable to receive, filter, amplify, and transmit terrestrial and non-terrestrial signals. The repeater system includes a donor port, a server port, a first direction amplification and filtering paths and second direction amplification and filtering paths coupled between the ports, and a controller. One or more donor antennas are configured to be coupled to a donor port of the repeater. One of the one or more donor ports can be configured to transmit and receive signals with an orbiting satellite.

34 Claims, 10 Drawing Sheets

(56)          References Cited

U.S. PATENT DOCUMENTS

| | | | | |
|---|---|---|---|---|
| 2023/0413203 A1* | 12/2023 | Ryu | .................. | H04W 56/0015 |
| 2024/0381117 A1* | 11/2024 | Yoshioka | .......... | H04W 72/0453 |

FOREIGN PATENT DOCUMENTS

| | | | | | |
|---|---|---|---|---|---|
| WO | WO-2019170866 A1 * | 9/2019 | ........ | H04W 36/0085 |
| WO | WO-2023131420 A1 * | 7/2023 | ............ | H04W 48/12 |

* cited by examiner

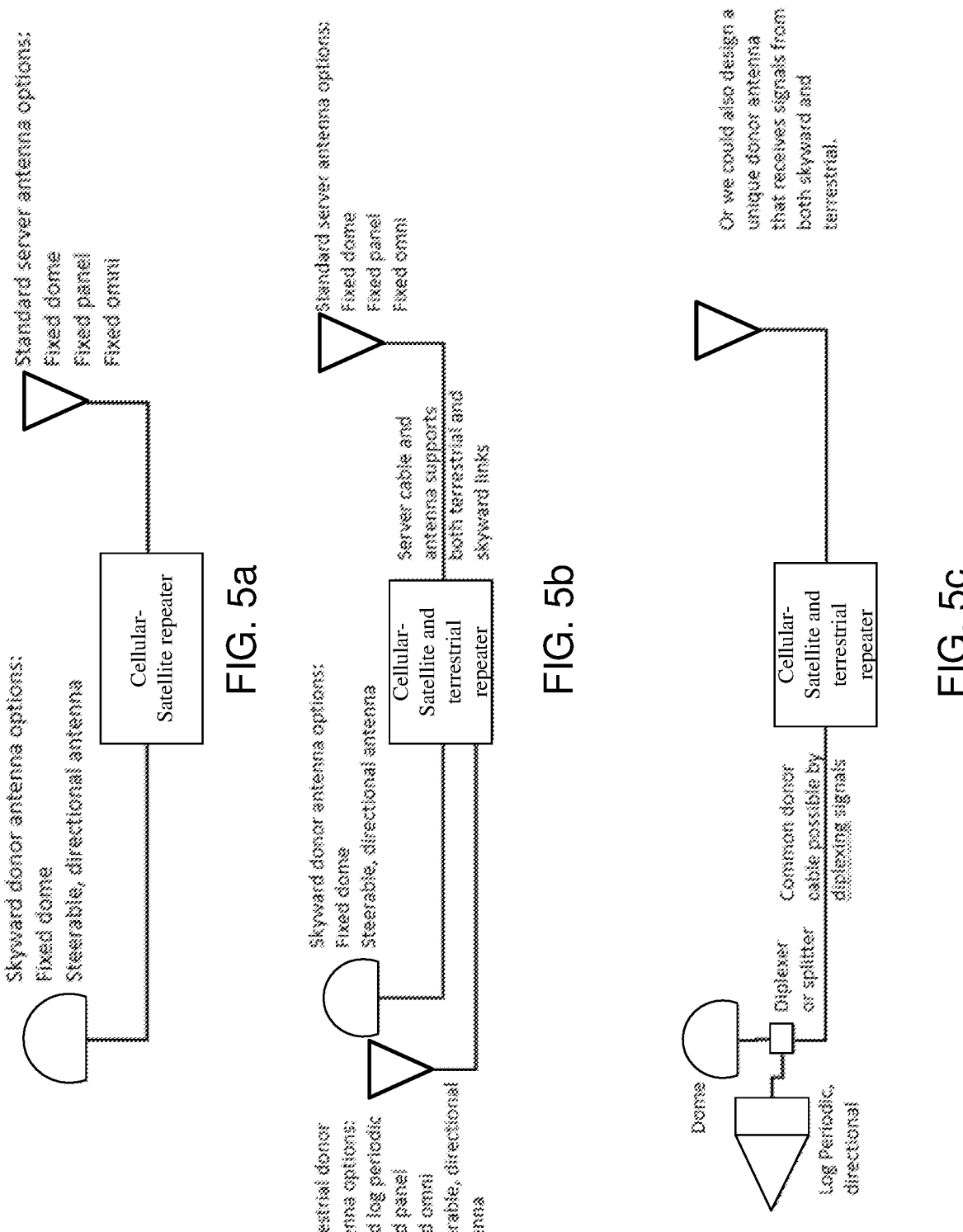

Standard server antenna options:
Fixed dome
Fixed panel
Fixed omni

Skyward donor antenna options:
Fixed dome
Steerable, directional antenna

Cellular-Satellite repeater

FIG. 5a

Standard server antenna options:
Fixed dome
Fixed panel
Fixed omni

Server cable and antenna supports both terrestrial and skyward links

Skyward donor antenna options:
Fixed dome
Steerable, directional antenna

Terrestrial donor antenna options:
Fixed log periodic
Fixed panel
Fixed omni
Steerable, directional antenna Cellular-Satellite and terrestrial repeater

FIG. 5b

Or we could also design a unique donor antenna that receives signals from both skyward and terrestrial.

Cellular-Satellite and terrestrial repeater

Common donor cable passible by diplexing signals

Dome

Diplexer or splitter

Log Periodic, directional

FIG. 5c

REPEATER SYSTEM FOR TERRESTRIAL AND NON-TERRESTRIAL SIGNALS

PRIORITY DATA

This application claims the benefit of U.S. Provisional Patent Application No. 63/413,926, filed Oct. 6, 2022, and U.S. Provisional Patent Application No. 63/403,680, filed Sep. 2, 2022, both of which are incorporated herein by reference.

BACKGROUND

Repeaters can be used to increase the quality of wireless communication between a wireless device and a wireless communication access point, such as a cell tower. Repeaters can increase the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 5a-5c illustrates example architectures of a cellular and non-terrestrial signal repeater system in accordance with an example;

Figure 1A:
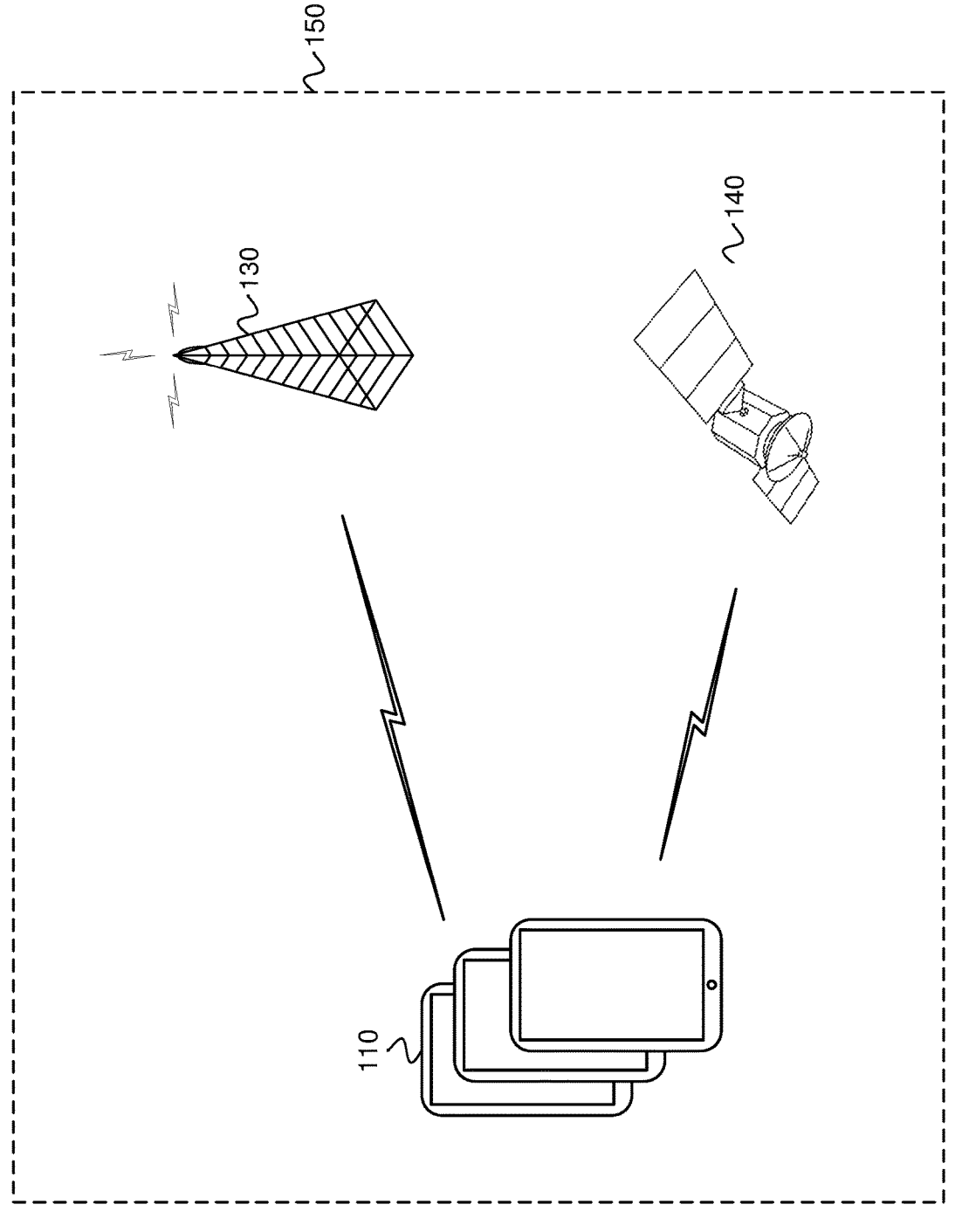
FIG. 1a illustrates a terrestrial and non-terrestrial cellular communication system in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Repeaters can increase the quality of wireless communication between a wireless device and a wireless communication access point by amplifying, filtering, or applying other processing techniques to uplink and downlink signals communicated between the wireless device and the wireless communication access point.

Cellular systems are rapidly increasing in capability with the design of new transmission and reception schemes in 5G cellular communication. In addition, a decreased cost in the access to low earth orbit is revolutionizing the satellite industry. Large arrays of low earth orbit satellites are providing new types of communication that is possible with cell phones. However, even low earth orbit satellite constellations orbit at a distance of 250 miles to 600 miles above the earth's surface. Cell phones (i.e. user equipment) are typically designed to transmit and receive signals from a base station that is located, at most, a few miles from the cell phone. Accordingly, the ability for a cell phone to communicate with a satellite is pushing the bounds of the cell phone and the satellite's capability. Any type of aberration in sending or receiving a signal between a satellite and a cell phone will likely reduce the power of the signal below the noise floor and make it difficult or impossible to receive.

A cellular repeater can be used to filter and amplify signals transmitted from non-terrestrial sources, such as low earth orbit (LEO) satellites, to cellular phones, such as 5G capable user equipment (UE). The cellular repeater can also filter and amplify signals from the UE configured to be transmitted to a satellite, such as a LEO satellite. The additional filtering and amplification of the signals can enable the signals to be successfully transmitted and received. In addition, the cellular repeater can enable satellite communications using user equipment (UEs) in places that are not possible, such as within houses, buildings, cabins, cars, boats, or other types of structures that impeded signals communicated between satellites and UEs such as cell phones, tablets, and mobile and desktop computers.

However, there are additional complexities that make it difficult for a cellular repeater to transmit and receive signals from a satellite. These difficulties include, but are not limited to, the low power of the signals received from satellites, government regulations limiting the amount of power that can be transmitted in uplink signals for cellular frequency bands by a cellular transmitter, such as 47 Code of Federal Regulations (CFR) Part 20 that covers commercial mobile services in the United States, different polarization of satellite signals from cellular signals, the different angles needed to communicate with satellites relative to terrestrial base stations, potential interference of much higher power cellular signals from terrestrial sources, such as base stations, new types of network protection issues when relatively high power signals configured to be transmitted to satellites cause interference with lower power cellular signals designed to be transmitted to base stations, and so forth.

These additional complexities have created the need for cellular repeaters with new capabilities to overcome the challenges of UEs to transmit and receive signals from non-terrestrial sources such as satellites.

As used herein, a terrestrial signal is a wireless signal that is transmitted from a terrestrial location (i.e. on Earth) and received at a terrestrial location (i.e. on Earth). A non-terrestrial signal is a signal that is transmitted from a non-terrestrial location, such as a satellite in low Earth orbit, or is received at a non-terrestrial location, such as the satellite in low Earth orbit. A non-terrestrial signal can include a signal that is transmitted from a non-terrestrial location to a terrestrial location, such as Earth, or a signal that is transmitted from a terrestrial location, such as Earth, to a non-terrestrial location, such as the satellite in low Earth orbit.

A non-terrestrial cellular signal can be a signal that is transmitted from, or received at, a non-terrestrial location, such as a satellite in low earth orbit, and is formatted for a cellular standard, such as the Third Generation Partnership Project (3GPP) standard. A non-terrestrial cellular signal can also be a signal that does not meet all of the formatting requirements of the cellular standard (due to its transmission or reception at a non-terrestrial location), but is transmitted in a cellular frequency band, such as a 3GPP Evolved Universal Terrestrial Radio Access (E-UTRA) band or a 3GPP New Radio (NR) frequency band.

FIG. 1a illustrates a cellular communication system 150 that comprises multiple user equipment (UEs) 110 that are in wireless communication with one or more base stations 130 and one or more satellites 140. The communication range between the UEs 110, base stations 130, and satellites 140 is limited based on distance between the UEs 110 and base stations 130, 140, government limitations on transmission power, interference, and other considerations. While one base station and one satellite is illustrated in this example, it is not intended to be limiting. A cellular communication system can include hundreds, or thousands of different base stations and satellites. Different types of base stations and satellites can also be used, including traditional high-power base stations designed to cover a broad range of up to kilometers of area, down to relatively low power base stations designed to be at a user's operating location and communicate hundreds of feet, along with low earth orbit (LEO) satellites designed to transmit and receive directly to user equipment, such as a 5G enabled cellular telephone. The cellular communication system 150 can have wired or wireless connections with each of the base stations 130, 140. The cellular communication system 150 can include additional cellular communications equipment that can be used to process cellular signals and provide information and instructions to the base station 130, satellite 140, and/or UEs 110 for communication within the cellular communication system 150.

Figure 1B:
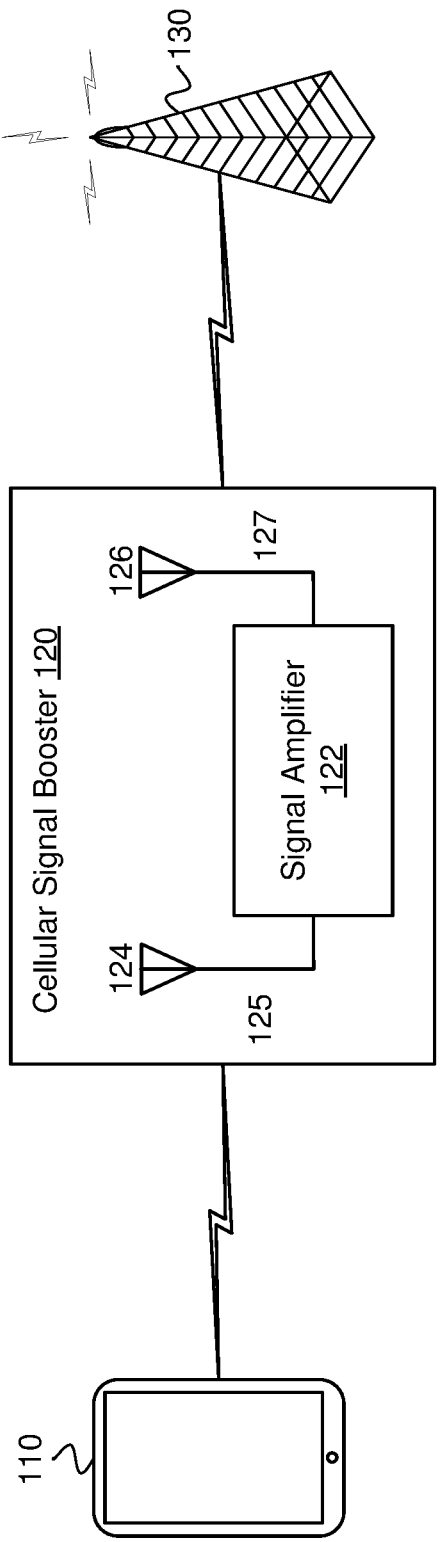
FIG. 1b illustrates a repeater in communication with a wireless device and a base station in accordance with an example.

FIG. 1b illustrates an exemplary repeater 120 in communication with a wireless device 110 and a base station 130. The repeater 120 can be referred to as a signal booster. A repeater can be an electronic device used to amplify (or boost) signals. The repeater 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the repeater 120 can amplify or boost uplink signals and/or downlink signals bi-directionally. In one example, the repeater 120 can be at a fixed location, such as in a home or office. Alternatively, the repeater 120 can be attached to a mobile object, such as a vehicle or a wireless device 110.

In one configuration, the repeater 120 can include a server antenna 124 (e.g., an inside antenna, device antenna, or a coupling antenna) and a donor antenna 126 (e.g., a node antenna or an outside antenna). The donor antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the server antenna 124 via a first coaxial cable 125 or other type of radio frequency connection operable to communicate radio frequency signals. The server antenna 124 can wirelessly communicate the downlink signal that has been amplified and filtered to the wireless device 110.

Similarly, the server antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the donor antenna 126 via the second coaxial cable 127 or other type of radio frequency connection operable to communicate radio frequency signals. The server antenna 126 can communicate the uplink signal that has been amplified and filtered to the base station 130.

In one example, the repeater 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the repeater 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one example, the repeater 120 can include a battery to provide power to various components, such as the signal amplifier 122, the server antenna 124 and the donor antenna 126. The battery can also power the wireless device 110 (e.g., phone or tablet). Alternatively, the repeater 120 can receive power from the wireless device 110.

In one configuration, the repeater, also referred to as a repeater 120, can be a Federal Communications Commission (FCC)-compatible consumer repeater. As a non-limiting example, the repeater 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 megahertz (MHz) Lower A-E Blocks, and 700 MHz Upper C Block), and 90 (Specialized Mobile Radio) of 47 C.F.R. The repeater 120 can be configured to automatically self-monitor its operation to ensure compliance with applicable noise and gain limits. The repeater 120 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 120 can improve the wireless connection between the wireless device 110 and the base station 130 (e.g., cell tower) or another type of wireless wide area network (WWAN) access point (AP) by amplifying desired signals relative to a noise floor. The repeater 120 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 120 can boost signals for 3GPP LTE Release 16.7.0 (October 2020) or other desired releases.

The repeater 120 can boost signals from the 3GPP Technical Specification (TS) 36.101 (Release 17 Jan. 2021) Evolved Universal Terrestrial Radio Access (E-UTRA) TDD frequency bands. The repeater 120 may also be configured to boost E-UTRA FDD frequency bands. In addition, the repeater 120 can boost selected frequency bands based on the country or region in which the repeater is used, including any of TDD bands 33-53, or other bands, as disclosed in 3GPP TS 36.104 V17.4.0 (January 2022), and depicted in Table 1.

TABLE 1

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE[1]) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24[9] | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |

TABLE 1-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

(NOTE[1]):

Band 6, 23 are not applicable.

(NOTE 2):

Restricted to E-UTRA operation when carrier aggregation is configured. The downlink operating band is paired with the uplink operating band (external) of the carrier aggregation configuration that is supporting the configured Pcell.

(NOTE 3):

This band is an unlicensed band restricted to licensed-assisted operation using Frame Structure Type 3.

(NOTE 4):

Band 46 is divided into four sub-bands as in Table 5.5-1A.

(NOTE 5):

The range 2180-2200 MHz of the DL operating band is restricted to E-UTRA operation when carrier aggregation is configured.

(NOTE[6]):

The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.

NOTE 7:

Void (NOTE 8):

This band is restricted to licensed-assisted operation using Frame Structure Type 3.

(NOTE[9]): DL operation is restricted to 1526-1536 MHz frequency range. UL operation is restricted to 1627.5-1637.5 MHz and 1646.5-1656.5 MHz per FCC Order DA 20-48.

In another configuration, the repeater 120 can boost TDD signals from the 3GPP Technical Specification (TS) 38.104 (Release 17 Jan. 2021) bands or 5G frequency bands, referred to as new radio operating bands. These bands typically begin with the prefix "n". In addition, the repeater 200 can boost selected frequency bands based on the country or region in which the repeater is used, including any of TDD bands n34-n53, n77-n79, n90, or n96 in frequency range 1 (FR1), n257-n262 in frequency range 2 (FR2), or other bands, as disclosed in 3GPP TS 38.104 V17.4.0 (January 2022), and depicted in Table 2 and Table 3:

TABLE 2

| NR operating band | Uplink (UL) operating band BS receive/UE transmit $F_{UL, low}$-$F_{UL, high}$ | Downlink (DL) operating band BS transmit/UE receive $F_{DL, low}$-$F_{DL, high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n24[7] | 1626.5 MHz-1660.5 MHz | 1525 MHz-1559 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD[3] |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n67 | N/A | 738 MHz-758 MHz | SDL |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n85 | 698 MHz-716 MHz | 728 MHz-746 MHz | FDD |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD[2] |
| n92 | 832 MHz-862 MHz | 1432 MHz-1517 MHz | FDD[2] |
| n93 | 880 MHz-915 MHz | 1427 MHz-1432 MHz | FDD[2] |
| n94 | 880 MHz-915 MHz | 1432 MHz-1517 MHz | FDD[2] |
| n95[1] | 2010 MHz-2025 MHz | N/A | SUL |
| n96[4] | 5925 MHz-7125 MHz | 5925 MHz-7125 MHz | TDD[3] |
| n97[5] | 2300 MHz-2400 MHz | N/A | SUL |

TABLE 2-continued

| NR operating band | Uplink (UL) operating band BS receive/UE transmit $F_{UL, low}$-$F_{UL, high}$ | Downlink (DL) operating band BS transmit/UE receive $F_{DL, low}$-$F_{DL, high}$ | Duplex mode |
|---|---|---|---|
| n98[5] | 1880 MHz-1920 MHz | N/A | SUL |
| n99[6] | 1626.5 MHz-1660.5 MHz | N/A | SUL |

NOTE[1]:
This band is applicable in China only.

NOTE[2]:
Variable duplex operation does not enable dynamic variable duplex configuration by the network, and is used such that DL and UL frequency ranges are supported independently in any valid frequency range for the band.

NOTE[3]:
This band is restricted to operation with shared spectrum channel access as defined in [20].

NOTE[4]:
This band is applicable in the USA only subject to FCC Report and Order [FCC 20-51].

NOTE[5]:
The requirements for this band are applicable only where no other NR or E-UTRA TDD operating band(s) are used within the frequency range of this band in the same geographical area. For scenarios where other NR or E-UTRA TDD operating band(s) are used within the frequency range of this band in the same geographical area, special co-existence requirements may apply that are not covered by the 3GPP specifications.

NOTE[6]:
UL operation is restricted to 1627.5-1637.5 MHz and 1646.5-1656.5 MHz per FCC Order DA 20-48.

NOTE[7]:
DL operation is restricted to 1526-1536 MHz-frequency range. UL operation is restricted to 1627.5-1637.5 MHz and 1646.5-1656.5 MHz per FCC Order DA 20-48.

TABLE 3

| | Uplink (UL) and Downlink (DL) operating band BS transmit/receive | | |
|---|---|---|---|
| NR operating band | UE transmit/receive $F_{UL, low}$-$F_{UL, high}$ $F_{DL, low}$-$F_{DL, high}$ | | Duplex mode |
| n257 | 26500 MHz-29500 MHz | | TDD |
| n258 | 24250 MHz-27500 MHz | | TDD |
| n259 | 39500 MHz-43500 MHz | | TDD |
| n260 | 37000 MHz-40000 MHz | | TDD |
| n261 | 27500 MHz-28350 MHz | | TDD |
| n262 | 47200 MHz-48200 MHz | | TDD |

For E-UTRA, each operating band can be divided into different channel bandwidths, depending on the size of the operating band. The channel bandwidths are disclosed in 3GPP TS 36.104 V17.4.0 (January 2022), and depicted in Table 4. The table shows the number of physical resource blocks (NRB) in each channel. The definition of a physical resource block (PRB) for EUTRA, also called a resource block (RB) is well known and is defined in 3GPP TS 36.211 V 17.4.0 (January 2022).

TABLE 4

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

For 5G, the New Radio (NR) operating bands can also be divided into different channel bandwidths. 5G was designed to have more flexibility, allowing for a number of different modalities than previous generations of cellular communication. Each NR operating band has different channel bandwidths that can be used. Each channel can include different subcarrier spacing (SCS). Table 5, shown below, provides an example of channel bandwidths for the NR operating bands in FR 1 and the available SCS for each NR operating band. The channel bandwidths are disclosed in 3GPP TS 36.101-1 V17.4.0 (January 2022). Table 6 shows the NR operating bands in FR 2, as disclosed in 3GPP TS 36.101-2 V17.4.0 (January 2022)

TABLE 5

| NR Band | SCS (kHz) | UE Channel bandwidth (MHz) | | | | | | | | | | | | | | |
|---|---|---|---|---|---|---|---|---|---|---|---|---|---|---|---|---|
| | | 5 | 10 | 15 | 20 | 25 | 30 | 35 | 40 | 45 | 50 | 60 | 70 | 80 | 90 | 100 |
| n1 | 15 | 5 | 10 | 15 | 20 | 25 | 30 | | 40 | 45[4] | 50 | | | | | |
| | 30 | | 10 | 15 | 20 | 25 | 30 | | 40 | 45[4] | 50 | | | | | |
| | 60 | | 10 | 15 | 20 | 25 | 30 | | 40 | 45[4] | 50 | | | | | |
| n2 | 15 | 5 | 10 | 15 | 20 | 25 | 30 | 35[4] | 40 | | | | | | | |
| | 30 | | 10 | 15 | 20 | 25 | 30 | 35[4] | 40 | | | | | | | |
| | 60 | | 10 | 15 | 20 | 25 | 30 | 35[4] | 40 | | | | | | | |
| n3 | 15 | 5 | 10 | 15 | 20 | 25 | 30 | 35[4] | 40 | 45[4] | 50 | | | | | |
| | 30 | | 10 | 15 | 20 | 25 | 30 | 35[4] | 40 | 45[4] | 50 | | | | | |
| | 60 | | 10 | 15 | 20 | 25 | 30 | 35[4] | 40 | 45[4] | 50 | | | | | |
| n5 | 15 | 5 | 10 | 15 | 20 | 25[3] | | | | | | | | | | |
| | 30 | | 10 | 15 | 20 | 25[3] | | | | | | | | | | |
| | 60 | | | | | | | | | | | | | | | |
| n7 | 15 | 5 | 10 | 15 | 20 | 25 | 30 | 35[4] | 40 | | 50 | | | | | |
| | 30 | | 10 | 15 | 20 | 25 | 30 | 35[4] | 40 | | 50 | | | | | |
| | 60 | | 10 | 15 | 20 | 25 | 30 | 35[4] | 40 | | 50 | | | | | |
| n8 | 15 | 5 | 10 | 15 | 20 | | | 35[3,4] | | | | | | | | |
| | 30 | | 10 | 15 | 20 | | | 35[3,4] | | | | | | | | |
| | 60 | | | | | | | | | | | | | | | |
| n12 | 15 | 5 | 10 | 15 | | | | | | | | | | | | |
| | 30 | | 10 | 15 | | | | | | | | | | | | |
| | 60 | | | | | | | | | | | | | | | |
| n13 | 15 | 5 | 10 | | | | | | | | | | | | | |
| | 30 | | 10 | | | | | | | | | | | | | |
| | 60 | | | | | | | | | | | | | | | |
| n14 | 15 | 5 | 10 | | | | | | | | | | | | | |
| | 30 | | 10 | | | | | | | | | | | | | |
| | 60 | | | | | | | | | | | | | | | |
| n18 | 15 | 5 | 10 | 15 | | | | | | | | | | | | |
| | 30 | | 10 | 15 | | | | | | | | | | | | |
| | 60 | | | | | | | | | | | | | | | |
| n20 | 15 | 5 | 10 | 15 | 20 | | | | | | | | | | | |
| | 30 | | 10 | 15 | 20 | | | | | | | | | | | |
| | 60 | | | | | | | | | | | | | | | |
| n24 | 15 | 5 | 10 | | | | | | | | | | | | | |
| | 30 | | 10 | | | | | | | | | | | | | |
| | 60 | | 10 | | | | | | | | | | | | | |
| n25 | 15 | 5 | 10 | 15 | 20 | 25 | 30 | 35[4] | 40 | 45[3,4] | | | | | | |
| | 30 | | 10 | 15 | 20 | 25 | 30 | 35[4] | 40 | 45[3,4] | | | | | | |
| | 60 | | 10 | 15 | 20 | 25 | 30 | 35[4] | 40 | 45[3,4] | | | | | | |
| n26 | 15 | 5 | 10 | 15 | 20 | | | | | | | | | | | |
| | 30 | | 10 | 15 | 20 | | | | | | | | | | | |
| n28 | 15 | 5 | 10 | 15 | 20[7] | | 30[7] | | | | | | | | | |
| | 30 | | 10 | 15 | 20[7] | | 30[7] | | | | | | | | | |
| | 60 | | | | | | | | | | | | | | | |
| n29 | 15 | 5 | 10 | | | | | | | | | | | | | |
| | 30 | | 10 | | | | | | | | | | | | | |
| | 60 | | | | | | | | | | | | | | | |
| n30 | 15 | 5 | 10 | | | | | | | | | | | | | |
| | 30 | | 10 | | | | | | | | | | | | | |
| | 60 | | | | | | | | | | | | | | | |
| n34 | 15 | 5 | 10 | 15 | | | | | | | | | | | | |
| | 30 | | 10 | 15 | | | | | | | | | | | | |
| | 60 | | 10 | 15 | | | | | | | | | | | | |
| n38 | 15 | 5 | 10[10] | 15 | 20[10] | 25 | 30[10] | | 40[10] | | | | | | | |
| | 30 | | 10[10] | 15 | 20[10] | 25 | 30[10] | | 40[10] | | | | | | | |
| | 60 | | 10[10] | 15 | 20[10] | 25 | 30[10] | | 40[10] | | | | | | | |
| n39 | 15 | 5 | 10 | 15 | 20 | 25 | 30 | | 40 | | | | | | | |
| | 30 | | 10 | 15 | 20 | 25 | 30 | | 40 | | | | | | | |
| | 60 | | 10 | 15 | 20 | 25 | 30 | | 40 | | | | | | | |
| n40 | 15 | 5[5] | 10 | 15 | 20 | 25 | 30 | | 40 | | 50 | | | | | |
| | 30 | | 10 | 15 | 20 | 25 | 30 | | 40 | | 50 | 60 | 70 | 80 | 90 | 100 |
| | 60 | | 10 | 15 | 20 | 25 | 30 | | 40 | | 50 | 60 | 70 | 80 | 90 | 100 |
| n41 | 15 | | 10 | 15 | 20 | | 30 | | 40 | | 50 | | | | | |
| | 30 | | 10 | 15 | 20 | | 30 | | 40 | | 50 | 60 | 70 | 80 | 90 | 100 |
| | 60 | | 10 | 15 | 20 | | 30 | | 40 | | 50 | 60 | 70 | 80 | 90 | 100 |
| n46 | 15 | | 10[5] | | 20 | | | | 40 | | | | | | | |
| | 30 | | 10[5] | | 20 | | | | 40 | | | 60 | | 80 | | |
| | 60 | | 10[5] | | 20 | | | | 40 | | | 60 | | 80 | | |
| n47 | 15 | | 10[10] | | 20[10] | | 30[10] | | 40[10] | | | | | | | |
| | 30 | | 10[10] | | 20[10] | | 30[10] | | 40[10] | | | | | | | |
| | 60 | | 10[10] | | 20[10] | | 30[10] | | 40[10] | | | | | | | |

TABLE 5-continued

| NR Band | SCS (kHz) | 5 | 10 | 15 | 20 | 25 | 30 | 35 | 40 | 45 | 50 | 60 | 70 | 80 | 90 | 100 |
|---|---|---|---|---|---|---|---|---|---|---|---|---|---|---|---|---|
| | | | | | | | | UE Channel bandwidth (MHz) | | | | | | | | |
| n48 | 15 | $5^5$ | 10 | 15 | 20 | | 30 | | 40 | | $50^6$ | | | | | |
| | 30 | | 10 | 15 | 20 | | 30 | | 40 | | $50^6$ | $60^6$ | $70^6$ | $80^6$ | $90^{6,4}$ | $100^6$ |
| | 60 | | 10 | 15 | 20 | | 30 | | 40 | | $50^6$ | $60^6$ | $70^6$ | $80^6$ | $90^{6,4}$ | $100^6$ |
| n50 | 15 | $5^5$ | 10 | 15 | 20 | | 30 | | 40 | | 50 | | | | | |
| | 30 | | 10 | 15 | 20 | | 30 | | 40 | | 50 | 60 | | $80^3$ | | |
| | 60 | | 10 | 15 | 20 | | 30 | | 40 | | 50 | 60 | | $80^3$ | | |
| n51 | 15 | 5 | | | | | | | | | | | | | | |
| | 30 | | | | | | | | | | | | | | | |
| | 60 | | | | | | | | | | | | | | | |
| n53 | 15 | 5 | 10 | | | | | | | | | | | | | |
| | 30 | | 10 | | | | | | | | | | | | | |
| | 60 | | 10 | | | | | | | | | | | | | |
| n65 | 15 | 5 | 10 | 15 | 20 | | | | | | 50 | | | | | |
| | 30 | | 10 | 15 | 20 | | | | | | 50 | | | | | |
| | 60 | | 10 | 15 | 20 | | | | | | 50 | | | | | |
| n66 | 15 | 5 | 10 | 15 | 20 | 25 | 30 | $35^4$ | 40 | $45^4$ | | | | | | |
| | 30 | | 10 | 15 | 20 | 25 | 30 | $35^4$ | 40 | $45^4$ | | | | | | |
| | 60 | | 10 | 15 | 20 | 25 | 30 | $35^4$ | 40 | $45^4$ | | | | | | |
| n67 | 15 | 5 | 10 | 15 | 20 | | | | | | | | | | | |
| | 30 | | 10 | 15 | 20 | | | | | | | | | | | |
| | 60 | | | | | | | | | | | | | | | |
| n70 | 15 | 5 | 10 | 15 | $20^3$ | $25^3$ | | | | | | | | | | |
| | 30 | | 10 | 15 | $20^3$ | $25^3$ | | | | | | | | | | |
| | 60 | | 10 | 15 | $20^3$ | $25^3$ | | | | | | | | | | |
| n71 | 15 | 5 | 10 | 15 | 20 | $25^3$ | $30^3$ | $35^{3,4}$ | | | | | | | | |
| | 30 | | 10 | 15 | 20 | $25^3$ | $30^3$ | $35^{3,4}$ | | | | | | | | |
| | 60 | | | | | | | | | | | | | | | |
| n74 | 15 | 5 | 10 | 15 | 20 | | | | | | | | | | | |
| | 30 | | 10 | 15 | 20 | | | | | | | | | | | |
| | 60 | | 10 | 15 | 20 | | | | | | | | | | | |
| n75 | 15 | 5 | 10 | 15 | 20 | 25 | 30 | | 40 | | 50 | | | | | |
| | 30 | | 10 | 15 | 20 | 25 | 30 | | 40 | | 50 | | | | | |
| | 60 | | 10 | 15 | 20 | 25 | 30 | | 40 | | 50 | | | | | |
| n76 | 15 | 5 | | | | | | | | | | | | | | |
| | 30 | | | | | | | | | | | | | | | |
| | 60 | | | | | | | | | | | | | | | |
| n77 | 15 | | 10 | 15 | 20 | 25 | 30 | | 40 | | 50 | | | | | |
| | 30 | | 10 | 15 | 20 | 25 | 30 | | 40 | | 50 | 60 | $70^4$ | 80 | $90^4$ | 100 |
| | 60 | | 10 | 15 | 20 | 25 | 30 | | 40 | | 50 | 60 | $70^4$ | 80 | $90^4$ | 100 |
| n78 | 15 | | 10 | 15 | 20 | 25 | 30 | | 40 | | 50 | | | | | |
| | 30 | | 10 | 15 | 20 | 25 | 30 | | 40 | | 50 | 60 | $70^4$ | 80 | 90 | 100 |
| | 60 | | 10 | 15 | 20 | 25 | 30 | | 40 | | 50 | 60 | $70^4$ | 80 | 90 | 100 |
| n79 | 15 | | 10 | | 20 | | 30 | | 40 | | 50 | | | | | |
| | 30 | | 10 | | 20 | | 30 | | 40 | | 50 | 60 | $70^4$ | 80 | 90 | 100 |
| | 60 | | 10 | | 20 | | 30 | | 40 | | 50 | 60 | $70^4$ | 80 | 90 | 100 |
| n80 | 15 | 5 | 10 | 15 | 20 | 25 | 30 | | 40 | | | | | | | |
| | 30 | | 10 | 15 | 20 | 25 | 30 | | 40 | | | | | | | |
| | 60 | | 10 | 15 | 20 | 25 | 30 | | 40 | | | | | | | |
| n81 | 15 | 5 | 10 | 15 | 20 | | | | | | | | | | | |
| | 30 | | 10 | 15 | 20 | | | | | | | | | | | |
| | 60 | | | | | | | | | | | | | | | |
| n82 | 15 | 5 | 10 | 15 | 20 | | | | | | | | | | | |
| | 30 | | 10 | 15 | 20 | | | | | | | | | | | |
| | 60 | | | | | | | | | | | | | | | |
| n83 | 15 | 5 | 10 | 15 | 20 | | $30^7$ | | | | | | | | | |
| | 30 | | 10 | 15 | 20 | | $30^7$ | | | | | | | | | |
| | 60 | | | | | | | | | | | | | | | |
| n84 | 15 | 5 | 10 | 15 | 20 | 25 | 30 | | 40 | | 50 | | | | | |
| | 30 | | 10 | 15 | 20 | 25 | 30 | | 40 | | 50 | | | | | |
| | 60 | | 10 | 15 | 20 | 25 | 30 | | 40 | | 50 | | | | | |
| n85 | 15 | 5 | 10 | 15 | | | | | | | | | | | | |
| | 30 | | 10 | 15 | | | | | | | | | | | | |
| | 60 | | | | | | | | | | | | | | | |
| n86 | 15 | 5 | 10 | 15 | 20 | | | | 40 | | | | | | | |
| | 30 | | 10 | 15 | 20 | | | | 40 | | | | | | | |
| | 60 | | 10 | 15 | 20 | | | | 40 | | | | | | | |
| n89 | 15 | 5 | 10 | 15 | 20 | | | | | | | | | | | |
| | 30 | | 10 | 15 | 20 | | | | | | | | | | | |
| | 60 | | | | | | | | | | 50 | | | | | |
| n90 | 15 | | 10 | 15 | 20 | | 30 | | 40 | | 50 | | | | | |
| | 30 | | 10 | 15 | 20 | | 30 | | 40 | | 50 | 60 | | 80 | 90 | 100 |
| | 60 | | 10 | 15 | 20 | | 30 | | 40 | | 50 | 60 | | 80 | 90 | 100 |
| n91 | 15 | 5 | $10^8$ | | | | | | | | | | | | | |
| | 30 | | | | | | | | | | | | | | | |
| | 60 | | | | | | | | | | | | | | | |

TABLE 5-continued

| NR Band | SCS (kHz) | 5 | 10 | 15 | 20 | 25 | 30 | 35 | 40 | 45 | 50 | 60 | 70 | 80 | 90 | 100 |
|---|---|---|---|---|---|---|---|---|---|---|---|---|---|---|---|---|
| n92 | 15 | 5 | 10 | 15 | 20 | | | | | | | | | | | |
| | 30 | | 10 | 15 | 20 | | | | | | | | | | | |
| | 60 | | | | | | | | | | | | | | | |
| n93 | 15 | 5 | 10[8] | | | | | | | | | | | | | |
| | 30 | | | | | | | | | | | | | | | |
| | 60 | | | | | | | | | | | | | | | |
| n94 | 15 | 5 | 10 | 15 | 20 | | | | | | | | | | | |
| | 30 | | 10 | 15 | 20 | | | | | | | | | | | |
| | 60 | | | | | | | | | | | | | | | |
| n95 | 15 | 5 | 10 | 15 | | | | | | | | | | | | |
| | 30 | | 10 | 15 | | | | | | | | | | | | |
| | 60 | | 10 | 15 | | | | | | | | | | | | |
| n96 | 15 | | | | 20 | | | | 40 | | | | | | | |
| | 30 | | | | 20 | | | | 40 | | | 60 | | 80 | | |
| | 60 | | | | 20 | | | | 40 | | | 60 | | 80 | | |
| n97 | 15 | 5 | 10 | 15 | 20 | 25 | 30 | | 40 | | 50 | | | | | |
| | 30 | | 10 | 15 | 20 | 25 | 30 | | 40 | | 50 | 60 | 70 | 80 | 90 | 100 |
| | 60 | | 10 | 15 | 20 | 25 | 30 | | 40 | | 50 | 60 | 70 | 80 | 90 | 100 |
| n98 | 15 | 5 | 10 | 15 | 20 | 25 | 30 | | 40 | | | | | | | |
| | 30 | | 10 | 15 | 20 | 25 | 30 | | 40 | | | | | | | |
| | 60 | | 10 | 15 | 20 | 25 | 30 | | 40 | | | | | | | |
| n99 | 15 | 5 | 10 | | | | | | | | | | | | | |
| | 30 | | 10 | | | | | | | | | | | | | |
| | 60 | | 10 | | | | | | | | | | | | | |

NOTE 1:
Void.
NOTE 2:
Void.
NOTE 3:
This UE channel bandwidth is applicable only to downlink.
NOTE 4:
This UE channel bandwidth is optional in this release of the specification.
NOTE 5:
For this bandwidth, the minimum requirements are restricted to operation when carrier is configured as an SCell part of DC or Carrier Aggregation (CA) configuration.
NOTE 6:
For this bandwidth, the minimum requirements are restricted to operation when carrier is configured as a downlink Secondary Cell (SCell) part of CA configuration.
NOTE 7:
For the 20 MHz bandwidth, the minimum requirements are specified for NR UL carrier frequencies confined to either 713-723 MHz or 728-738 MHz. For the 30 MHz bandwidth, the minimum requirements are specified for NR UL transmission bandwidth configuration confined to either 703-733 or 718-748 MHz.
NOTE 8:
This UE channel bandwidth is applicable only to uplink.
NOTE 9:
Void.
NOTE 10:
These UE channel bandwidths are applicable to sidelink operation The number of 3GPP LTE or 5G frequency bands and the level of signal improvement can vary based on a particular wireless device, cellular node, or location. Additional domestic and international frequencies can also be included to offer increased functionality. Selected models of the repeater 120 can be configured to operate with selected frequency bands based on the location of use. In another example, the repeater 120 can automatically sense from the wireless device 110 or base station 130 (or GPS, etc.) which frequencies are used, which can be a benefit for international travelers.

In one example, the repeater can be configured to transmit a downlink (DL) signal in a millimeter wave (mm Wave) frequency range, and transmit an uplink (UL) signal in a sub-6 gigahertz (GHz) frequency range. In this example, a mm Wave frequency range can be a frequency between 6 GHz and 300 GHz.

In one configuration, multiple repeaters can be used to amplify UL and DL signals. For example, a first repeater can be used to amplify UL signals and a second repeater can be used to amplify DL signals. In addition, different repeaters can be used to amplify different frequency ranges.

In one configuration, the repeater 120 can be configured to identify when the wireless device 110 receives a relatively strong downlink signal. An example of a strong downlink signal can be a downlink signal with a signal strength greater than approximately −80 dBm.

Figure 2:
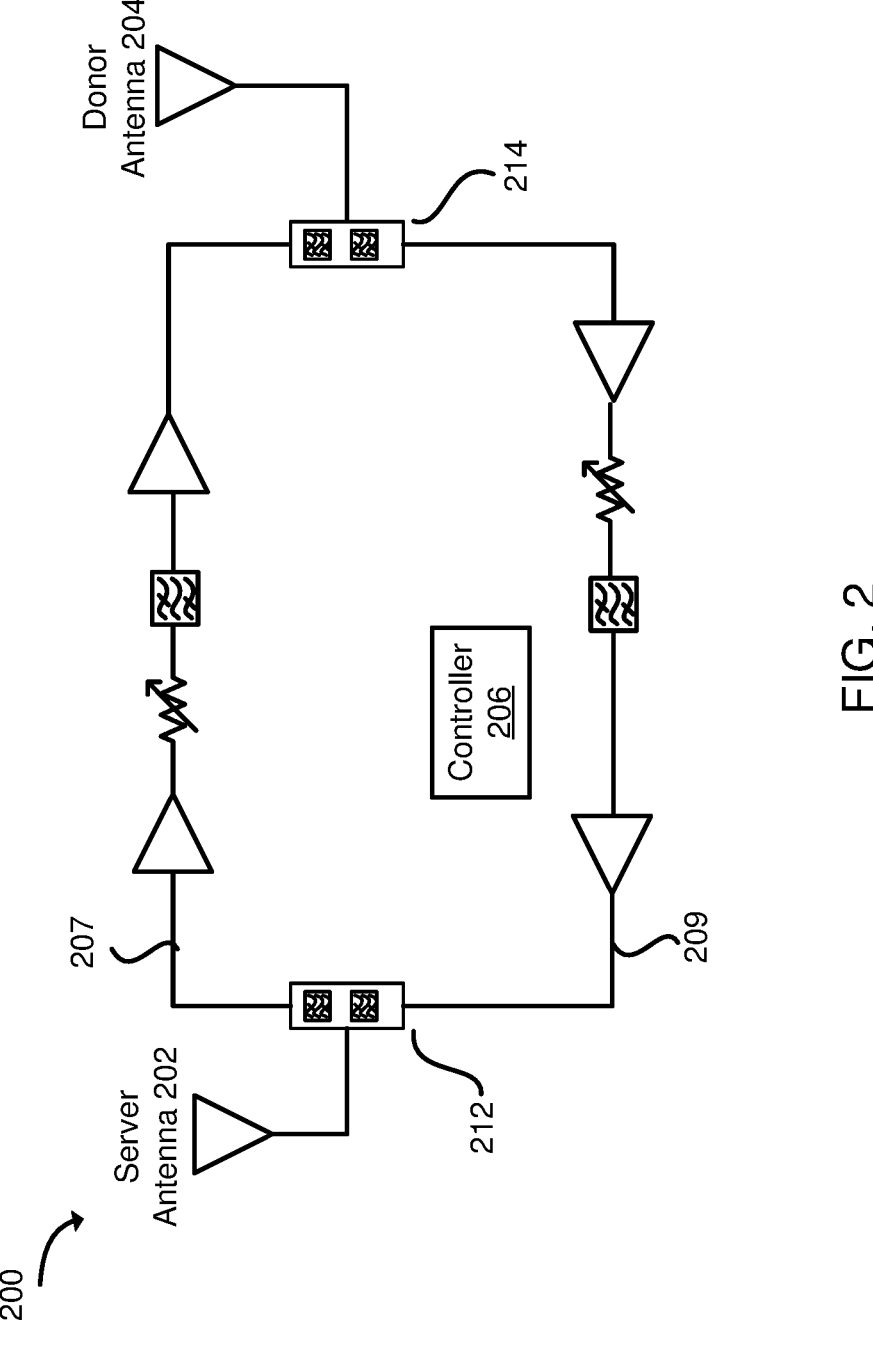
FIG. 2 illustrates a repeater having a first direction amplification and filtering path and a second direction amplification and filtering path in accordance with an example.

In an example, as illustrated in FIG. 2, a bi-directional repeater system can comprise a repeater 200 connected to a donor antenna 204 and a server antenna 202. The repeater 200 can include a donor antenna port that can be internally coupled to a second duplexer (or diplexer or multiplexer or circulator or splitter) 214. The repeater 200 can include a server antenna port that can also be coupled to a first duplexer (or diplexer or multiplexer or circulator or splitter) 212. Between the two duplexers, 214 and 212, can be two paths: a first path and a second path. The first path can comprise a low noise amplifier (LNA) with an input coupled to the first duplexer 212, a variable attenuator coupled to an output of the LNA, a filter coupled to the variable attenuator, and a power amplifier (PA) coupled between the filter and the second duplexer 214. The LNA can amplify a lower power signal without degrading the signal to noise ratio. The PA can adjust and amplify the power level by a desired amount. A second path can comprise an LNA with an input coupled to the second duplexer 214, a variable attenuator coupled to an output of the LNA, a filter coupled to the variable attenuator, and a PA coupled between the filter and the first duplexer 212. The first path can be a downlink amplification path or an uplink amplification path. The second path can be a downlink amplification path or an uplink amplification path. The repeater 200 can also comprise a controller 206. In one example, the controller 206 can include one or more processors and memory.

In some embodiments the controller 206 can adjust the gain of the first path and/or the second path based on wireless communication conditions. If included in the repeater 200, the controller 206 can be implemented by any suitable mechanism, such as a program, software, function, library, software as a service, analog or digital circuitry, or any combination thereof. The controller 206 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the first path and/or the second path. For example, the adjustments can be based on radio frequency (RF) signal inputs.

The memory can include any suitable computer readable media configured to retain program instructions and/or data for a period of time. By way of example, and not limitation, such computer readable media can include tangible computer readable storage media including random access memory (RAM), read only memory (ROM), electrically erasable programmable read only memory (EEPROM), a compact disk (CD) ROM or other optical disk storage, magnetic disk storage or other magnetic storage devices, flash memory devices (e.g., solid state memory devices) or any other storage medium which can be used to carry or store desired program code in the form of computer executable instructions or data structures and which can be accessed by a general purpose or special purpose computer. Combinations of the above can also be included within the scope of computer readable media. Computer executable instructions can include, for example, instructions and data that cause a general-purpose computer, special purpose computer, or special purpose processing device to perform a certain function or group of functions.

Figure 3:
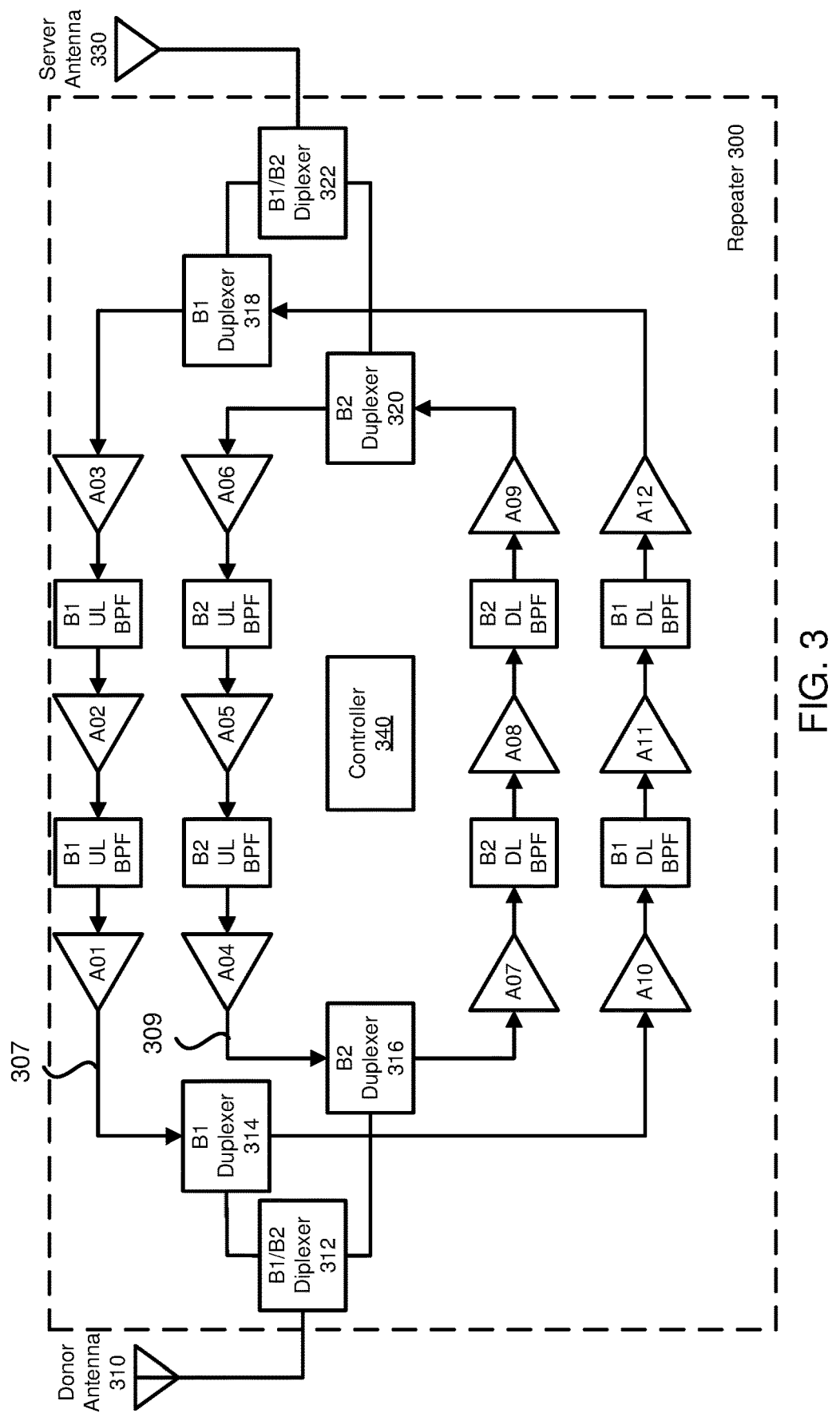
FIG. 3 illustrates a multiband repeater in accordance with an example.

In another example, as illustrated in FIG. 3, a repeater can be configured as a multiband bi-directional FDD wireless signal booster 300 configured to amplify an uplink signal and a downlink signal in multiple bands or channels using a separate signal path for one or more uplink frequency bands or channels and one or more downlink frequency bands or channels. In one embodiment, adjacent bands can be included on a same signal path. A controller 340 can adjust the gain of each signal path based on wireless communication conditions.

A donor antenna 310, or an integrated node antenna, can receive a downlink signal. For example, the downlink signal can be received from a base station. The downlink signal can be provided to a first B1/B2 diplexer 312, wherein B1 represents a first frequency band and B2 represents a second frequency band. The first B1/B2 diplexer 312 can direct selected portions of a received signal to a B1 downlink signal path and a B2 downlink signal path. A downlink signal that is associated with B1 can travel along the B1 downlink signal path to a first B1 duplexer 314. A portion of the received signal that is within the B2 can travel along the B2 downlink signal path to a first B2 duplexer 316. After passing the first B1 duplexer 314, the downlink signal can travel through a series of amplifiers (e.g. A10, A11, and A12) and downlink bandpass filters (e.g. B1 DL BPF) to a second B1 duplexer 318. In addition, the B2 downlink signal passing through the B2 duplexer 316, can travel through a series of amplifiers (e.g. A07, A08, and A09) and downlink band pass filters (e.g. B2 DL BPF) to a second B2 duplexer 320. At this point, the downlink signals (B1 or B2) have been amplified and filtered in accordance with the type of amplifiers and BPFs included in the multiband bi-directional wireless signal booster 300. The downlink signals from the second B1 duplexer 318 or the second B2 duplexer 320, respectively, can be provided to a second B1/B2 diplexer 322. The second B1/B2 diplexer 322 can direct the B1/B2 amplified downlink signal to a server antenna 330, or an integrated device antenna. The server antenna 330 can communicate the amplified downlink signal to a wireless device, such as a UE.

In another example, the server antenna 330 can receive an uplink (UL) signal from a wireless device. The uplink signal can include a first frequency range, such as a Band 1 signal and a second frequency range, such as a Band 2 signal. The uplink signal can be provided to the second B1/B2 diplexer 322. The second B1/B2 diplexer 322 can direct the signals, based on their frequency, to a B1 uplink signal path and a B2 uplink signal path. An uplink signal that is associated with B1 can travel along the B1 uplink signal path to a second B1 duplexer 318, and an uplink signal that is associated with B2 can travel along the B2 uplink signal path to a second B2 duplexer 320. The second B1 duplexer 318 can direct the B1 uplink signal to travel through a series of amplifiers (e.g. A01, A02, and A03) and uplink bandpass filters (B1 UL BPF) to the first B1 duplexer 314. In addition, the second B2 duplexer 320 can direct the B2 uplink signal to travel through a series of amplifiers (e.g. A04, A05, and A06) and downlink band pass filters (B2 UL BPF) to the first B2 duplexer 316. At this point, the uplink signals (B1 and B2) have been amplified and filtered in accordance with the type of amplifiers and BPFs included in the bi-directional wireless signal booster 300. The uplink signals from the first B1 duplexer 314 and the first B2 duplexer 316, respectively, can be provided to the first B1/B2 diplexer 312. The first B1/B2 diplexer 312 can direct the B1 and B2 amplified uplink signals to the donor antenna 310, or an integrated device antenna. The donor antenna 310 can communicate the amplified uplink signals to a base station.

When the uplink signal received at a base station from a UE is clear (i.e. has relatively low noise) and has relatively high power, the base station is configured to assume that the UE is relatively close or has a direct line of sight to the base station and/or has relatively low levels of interference. Similarly, a UE is configured to measure downlink signals transmitted from the base station to the UE. When the downlink signal received at the UE is clear and has relatively high power, then the base station and UE continue to assume that the UE is located close to the base station or has a direct line of sight with low levels of interference between the UE and the base station. Certain assumptions are then made by the cellular communications system, the base station, and/or the UE. The assumptions can include the transmit power for transmitted signals, the timing of the signals, the band(s) selected for the transmission and reception of the signals, the type of carrier aggregation used, the modulation and coding scheme used in the transmission and reception of the signals, and so forth. Additional determinations in 5G communications can include whether frequency hopping is used, and whether a whole band or a bandwidth part (BWP) is used for communication with the UE.

When cellular repeaters are used, unbeknownst to the cellular communication system, the uplink and downlink signals communicated by the cellular repeater typically have higher power levels and lower noise power levels relative to cellular signals when the cellular repeater is not used. In response to the higher power signals with and lower noise power, the cellular communication system may select to transmit downlink signals from the base station with a lower transmit power level and/or a higher modulation and coding scheme (MCS). For example, a modulation of 64 phase shift key (PSK) may be used instead of 16PSK, QPSK or BPSK. Similarly, a coding scheme may be selected that assumes minimal noise and maximum data throughput. In addition, the downlink signal from the base station may be transmitted at a lower power level that is below the maximum power the base station is permitted to transmit.

Unfortunately, the assumptions and selections made by the cellular communication system are typically inaccurate for a signal that is filtered and amplified by a cellular repeater. The cellular repeater and the associated UE are typically further away from the base station than the measurements by the cellular communication system show. In many cases, a cellular repeater is used at locations that are sufficiently far from the base station, that the downlink signal from the base station may not be able to be received at a UE without the use of the cellular repeater. Without the filtering and amplification of the cellular signal by the cellular repeater, the cellular signal does not have sufficient amplitude and/or has too high of a signal to noise ratio to be successfully received and decoded at the UE. Similarly, the base station may not be capable of receiving the uplink signal transmitted by the UE. The filtering and amplification of the downlink signal(s) and uplink signal(s) by the cellular repeater makes it appear to the UE that the base station is fairly close or in a direct line of site with low levels of interference based on the signal power and noise levels of the cellular signal. However, the base station may be a substantial distance away from the UE.

It is typically not possible for the cellular repeater to inform the cellular communication system that a cellular signal has been filtered and amplified by the repeater. Accordingly, the cellular communication system is not capable of making informed decisions with regards to cellular signals that have been filtered and/or amplified by a cellular repeater.

To overcome the limitations caused by the incorrect assumptions and selections made by the cellular communication system with respect to filtered and amplified cellular signals from a cellular repeater, the cellular repeater can be configured to make operational adjustments to the downlink and uplink signals that can result in higher throughput between the base station and the UE, via the cellular repeater.

The operational adjustments can be performed based on UE connectivity metrics of the UE in the cellular communication system. The UE connectivity metrics may be measured by the UE, one or more base stations in communication with the UE, or the cellular communication system. In addition, the UE connectivity metrics can include data throughput between the UE and the one or more base stations, and signal power measurements performed at the cellular repeater of downlink signals sent from the one or more base stations to the UE and uplink signals transmitted from the UE to the one or more base stations. In one embodiment, the UE connectivity metrics that are associated with a selected base station, or communication between the UE and a selected base station, can include a base station identifier for each recorded metric. For example, a common identifier for a base station is a cell ID of the base station. Accordingly, the UE connectivity metrics can include a cell ID of a base station when the metric is associated with the base station. The UE connectivity metrics can include measurements for multiple base stations, with each measurement associated with the cell ID of the base station.

Figure 4:
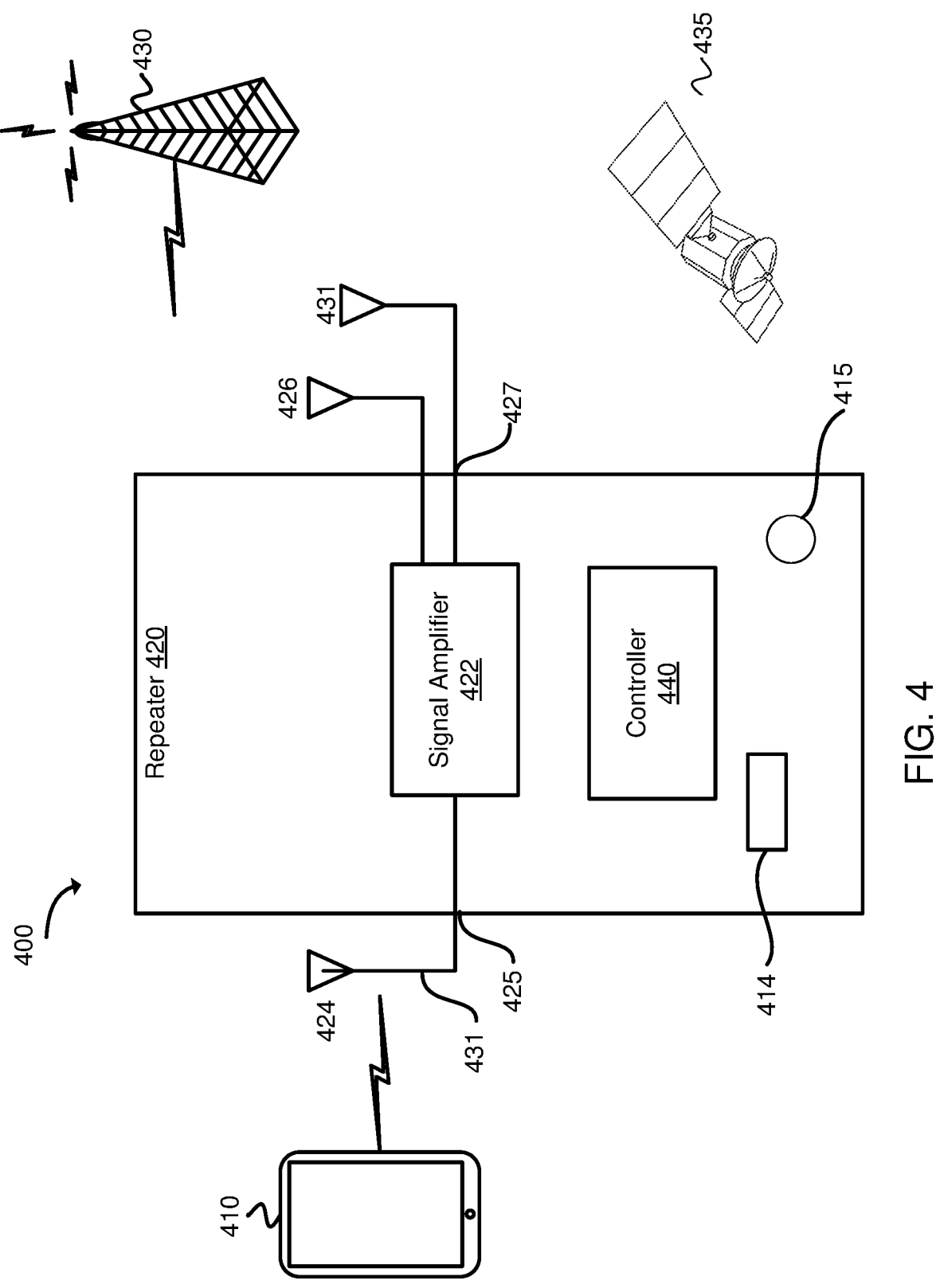
FIG. 4 illustrates a cellular and non-terrestrial signal repeater system in accordance with an example.

In accordance with one embodiment of the present invention, illustrated in the example of FIG. 4, a repeater system 400 is disclosed that is operable to receive and transmit signals from terrestrial sources, such as base stations, and receive and transmit signals from non-terrestrial sources such as satellites.

In one example, a cellular repeater system 400 for terrestrial and non-terrestrial signals 420 can comprise a cellular repeater 420 comprising: a donor port 427, a server port 425, a first-direction amplification and filtering signal path coupled between the donor port and the server port (i.e. FIG. 2, 207), a second-direction amplification and filtering signal path coupled between the donor port and the server port (i.e. FIG. 2, 209); and a donor antenna 426 configured to be coupled to the donor port 427 of the cellular repeater 420, wherein the donor antenna 426 is a fixed direction, wide beamwidth antenna configured to receive signals from both terrestrial based cellular base stations 430 and from an orbiting satellite 435.

In one embodiment, the donor antenna 426 is further configured to receive non-terrestrial signals in one or more cellular frequency bands or one or more satellite frequency bands from the orbiting satellite 435. The non-terrestrial signals can include traditional satellite signals transmitted from the satellite in the satellite frequency bands, and signals transmitted from the satellite in a cellular frequency band, referred to as non-terrestrial cellular signals.

In one embodiment, the cellular repeater system 400 further comprises a received power detector 414 and an indicator 415 to indicate when the cellular signals from the orbiting satellite 435 are received with a power level at the cellular repeater 420 that is greater than a selected threshold to enable a user to position the donor antenna 426 to receive the cellular signals from the orbiting satellite 435.

In one embodiment, the donor antenna 426 further comprises a battery power source or a solar panel power source to power the received power detector and the indicator (not shown). The donor antenna can have a gain of 3 decibels relative to isotropic (dBi).

The donor antenna can be a broadband antenna, with a beamwidth of greater than 90 degrees, or 120 degrees, or 150 degrees, or 180 degrees.

In one embodiment, the donor antenna can be comprised of two or more antennas 426, 431, communicatively coupled to the donor port 427 through a diplexer, a splitter, a switch, a coupler, or an impedance matching circuit (see FIG. 5c).

In one embodiment, the two or more donor antennas 426, 431, can be coupled to the donor port 427 of the cellular repeater 420 using a common coaxial cable communicatively coupled between the two or more antennas and the donor port.

In one embodiment, the donor antenna is comprised of two or more independent donor antennas 426, 431, with each donor antenna having an independent coaxial cable coupled between the donor antenna and one or more donor ports at the repeater, as shown in FIG. 5*c*.

In another embodiment, a server antenna 424 is configured to be coupled to the server port 425. A single coaxial cable 431 can be coupled between the server antenna 424 and the server port 425.

Examples of an antenna with a wide beamwidth include, but is not limited to: a Log periodic antenna, a Horn antenna, a Helix antenna, a Spiral antenna, a Vivaldi antenna, a dome antenna, an omni antenna, and a dipole antenna.

In another embodiment, a cellular and non-terrestrial signal repeater system 400 comprises: a cellular and non-terrestrial signal repeater 420, comprising: a donor port 427, a server port 425, a controller 440, one or more of: a terrestrial signal amplification and filtering path (i.e. FIG. 3, 307) coupled between the donor port and the server port; or a non-terrestrial signal amplification and filtering path (i.e. 309, FIG. 3) coupled between the donor port 427 and the server port 425 and configured to filter and amplify the terrestrial and/or non-terrestrial signals. The repeater system 400 can include a single path that is configured to filter and amplify both the terrestrial signals and non-terrestrial signals, or two separate amplification and filtering paths, with one for terrestrial signals and one for non-terrestrial signals. The cellular and non-terrestrial signal repeater system 400 can further comprise a terrestrial donor antenna 426 configured to be coupled to the donor port 427; and a non-terrestrial donor antenna 431 configured to be coupled to the donor port, wherein the non-terrestrial donor antenna is a narrow beamwidth antenna with a selected beam width and configured to be directed in an upwards direction towards an orbiting satellite.

The cellular and non-terrestrial signal repeater system 400 can further comprise a server antenna 424 configured to be coupled to the server port 425 and configured to transmit the non-terrestrial signals to a user equipment (UE) 410 and receive an uplink signal from the UE 410 for transmission to a satellite 435 via the non-terrestrial donor antenna 431.

The cellular and non-terrestrial signal repeater system 400 can further comprise a diplexer, a combiner, a switch, a coupler or a matching network circuit coupled to the terrestrial donor antenna 426 and the non-terrestrial donor antenna 431 and the donor port 427 (i.e. FIG. 5*c*).

In one embodiment, the non-terrestrial donor antenna 431 is configured to receive circularly polarized non-terrestrial signals from the orbiting satellite 435 and attenuate horizontal plane waves from terrestrial base stations 430. For example, the horizontal plane waves can be attenuated by 3 dB relative to circularly polarized waves received from the satellite 435. In one embodiment, the non-terrestrial donor antenna 431 can be a helical antenna that is configured to receive circularly polarized waves.

The cellular and non-terrestrial signal repeater can further comprise a switch coupled to the terrestrial donor antenna 426 and the non-terrestrial donor antenna 431 and the donor port 427 (see FIG. 5*c*) to switch the donor port 427 between the antennas 426 and 431.

In one embodiment, the selected beamwidth of the non-terrestrial donor antenna is less than or equal to 40 degrees, or less than or equal to 30 degrees, or less than or equal to 20 degrees.

In one embodiment, the non-terrestrial donor antenna can have a gain of greater than or equal to 10 decibels relative to isotropic (dBi) or a gain that is greater than or equal to 20 decibels relative to isotropic (dBi).

In one embodiment, the non-terrestrial donor antenna 431 is configured to receive cellular signals in one or more cellular frequency bands (i.e. 3GPP bands) from the orbiting satellite 435. The non-terrestrial donor antenna 431 can be a fixed antenna in a specific direction and orientation selected to maximize the power received at the antenna 435. Alternatively, the non-terrestrial donor antenna can be a tracking antenna, such as an antenna attached to a motor configured to track the satellite 435 or a phased array antenna that can be electronically steered to maximize the power received at the antenna 431 or transmitted from the antenna 431 to the satellite 435.

In one embodiment, the non-terrestrial donor antenna 431 can be an antenna with a narrow beamwidth that is one or more of a helical antenna, a dish antenna, a log-periodic antenna, a horn antenna, a Yagi antenna, a single element dipole antenna, a loop antenna, or a microstrip patch antenna.

In one embodiment, the cellular and non-terrestrial signal repeater system can be configured to provide network protection to one or more of the satellites 435 or the base stations 430. In one example, the non-terrestrial donor antenna 431 can be configured to receive cellular signals in one or more cellular. frequency bands from the orbiting satellite 435.

In one embodiment, the controller 440 can be configured to measure a power level of downlink signals received on the terrestrial donor antenna 426 that are in the one or more cellular frequency bands and adjust uplink power transmissions, uplink noise power transmissions, or uplink signal path gain on the non-terrestrial signal amplification and filtering path (or the single amplification and filtering path) based on the terrestrial signal received power level.

In one embodiment, the controller 440 can be configured to measure a power level of uplink signals received at the repeater 420 in the one or more cellular frequency bands and adjust uplink power transmissions on the non-terrestrial signal amplification and filtering path (or the single amplification and filtering path) based on the power level.

In one embodiment, the controller can be configured to set an uplink gain level for an uplink signal on the non-terrestrial signal amplification and filtering path (or the single amplification and filtering path) for a selected sub-band of the uplink signal within the one or more cellular frequency bands, wherein the selected sub-band is used for communicating the uplink signal to the orbiting satellite 435 via the non-terrestrial donor antenna 431.

In one embodiment, the uplink gain level of the selected sub-band in the uplink signal can be greater than a gain level allowed by a governmental agency (i.e. the FCC in Part 20) for a transmission of cellular uplink signals by a repeater.

In one embodiment, the non-terrestrial signal amplification and filtering path can include one or more analog or digital filters to limit a bandwidth of the uplink signal to the selected sub-band. For example, the uplink signal power can be limited to the G band in the PCS spectrum that can be used to communicate between UEs and satellites.

FIGS. 5*a-c* shows various configurations of the repeater system 400 that can be used for the repeater to filter and amplify both terrestrial signals received from and transmitted to base stations 430 and non-terrestrial signals received from and transmitted to satellites 435.

Figure 6A:
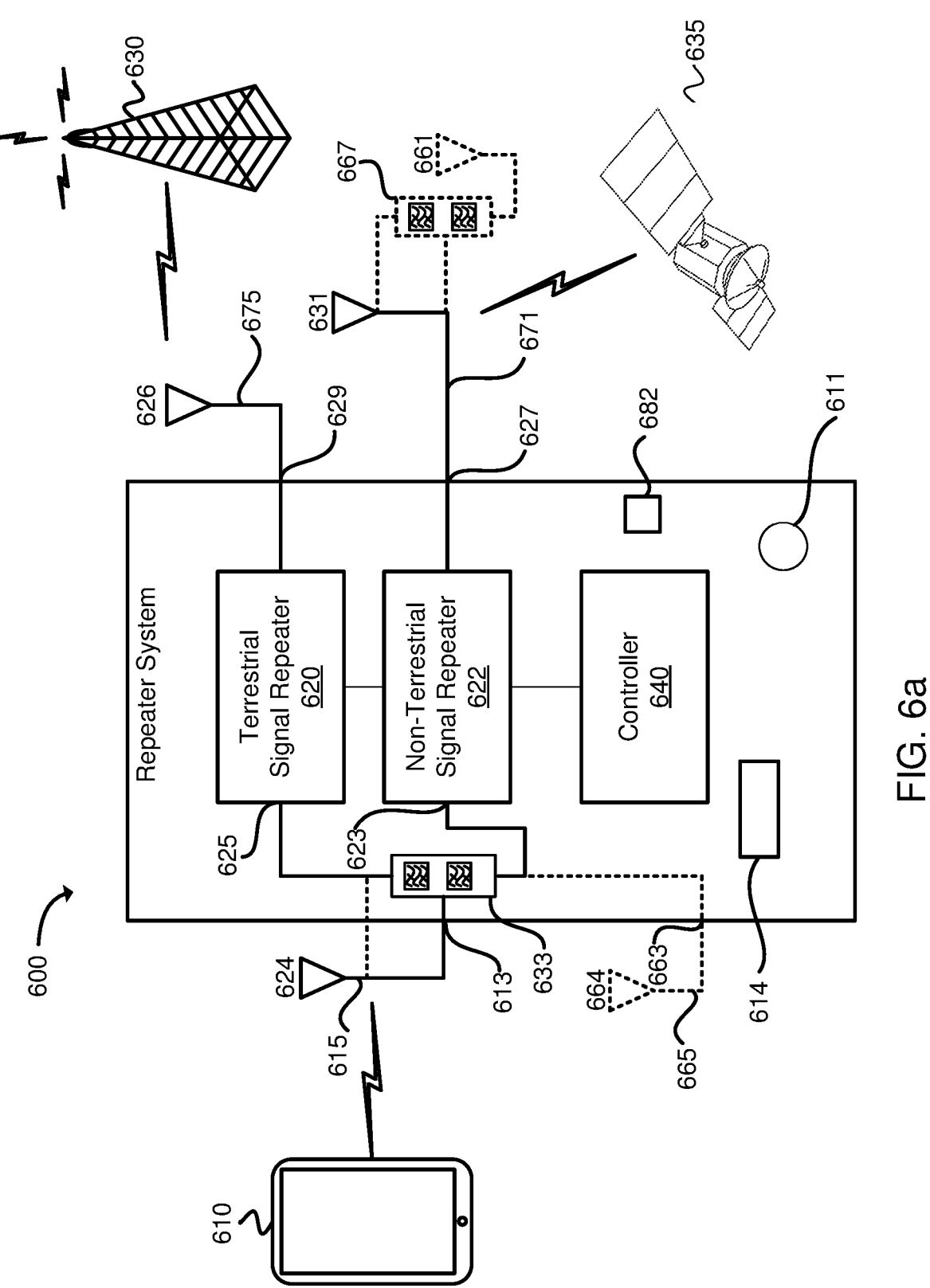
FIG. 6a illustrates a repeater system with a terrestrial signal repeater and a non-terrestrial signal repeater in accordance with an example.

FIG. 6*a* illustrates an example embodiment of a repeater system 600 for repeating terrestrial and non-terrestrial signals. The repeater system 600 can comprise a terrestrial signal repeater 620, which can comprise a terrestrial donor port 629 configured to receive terrestrial cellular signals from and transmit terrestrial cellular signals to a base station 630. The terrestrial signal repeater 620 can further comprise a terrestrial server port 625.

Figure 6B:
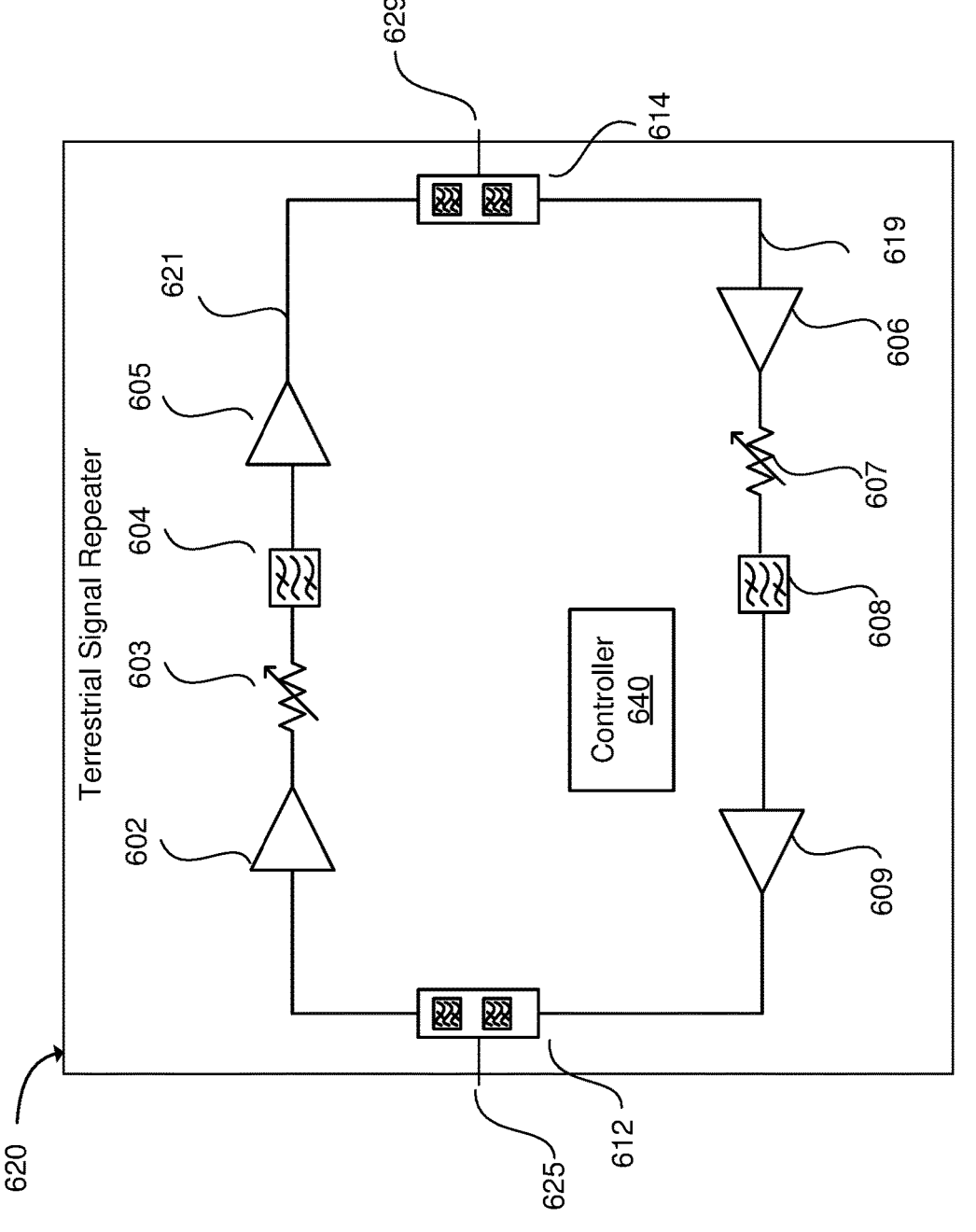
FIG. 6b illustrates a terrestrial signal repeater in accordance with an example.

As illustrated in the example of FIG. 6b, the terrestrial signal repeater 620 can further comprise a first-direction terrestrial amplification and filtering signal path 621 that is coupled between the terrestrial donor port 629 and the terrestrial server port 625 of the terrestrial signal repeater 620. The first-direction terrestrial amplification and filtering signal path 621 can comprise a low noise amplifier (LNA) 602, a variable attenuator 603, a filter 604, and a power amplifier (PA) 605. The LNA 602 can amplify a low power signal with minimal degradation of the signal to noise ratio of the low power signal. The PA 605 can adjust and amplify the power level of the low power signal by a desired amount. A second-direction terrestrial amplification and filtering signal path 619 can be coupled between the terrestrial donor port 629 and the non-terrestrial server port 625. The second-direction terrestrial amplification and filtering signal path 619 can comprise an LNA 606, a variable attenuator 607, a filter 608, and a PA 609. The first-direction path 621 can be a downlink amplification path or an uplink amplification path. The second-direction path 619 can be a downlink amplification path or an uplink amplification path. The terrestrial signal repeater 620 can also be coupled to the controller 640 of FIG. 6a. In one example, the controller 640 can include one or more processors and memory. The first-direction path 621 and the second-direction path 619 can be coupled to the ports 625 and 629 via a duplexer or diplexer 612, 614. A switch, or circulator may also be used in certain embodiments in place of the duplexer or diplexer.

The repeater system 600 of FIG. 6a can further comprise a non-terrestrial signal repeater 622. The non-terrestrial signal repeater can comprise a non-terrestrial donor port 627 configured to receive a terrestrial cellular signal from a base station 630 or a non-terrestrial signal or a non-terrestrial cellular signal from an orbiting satellite 635. The non-terrestrial signal repeater 622 can further comprise a non-terrestrial server port 621.

Figure 6C:
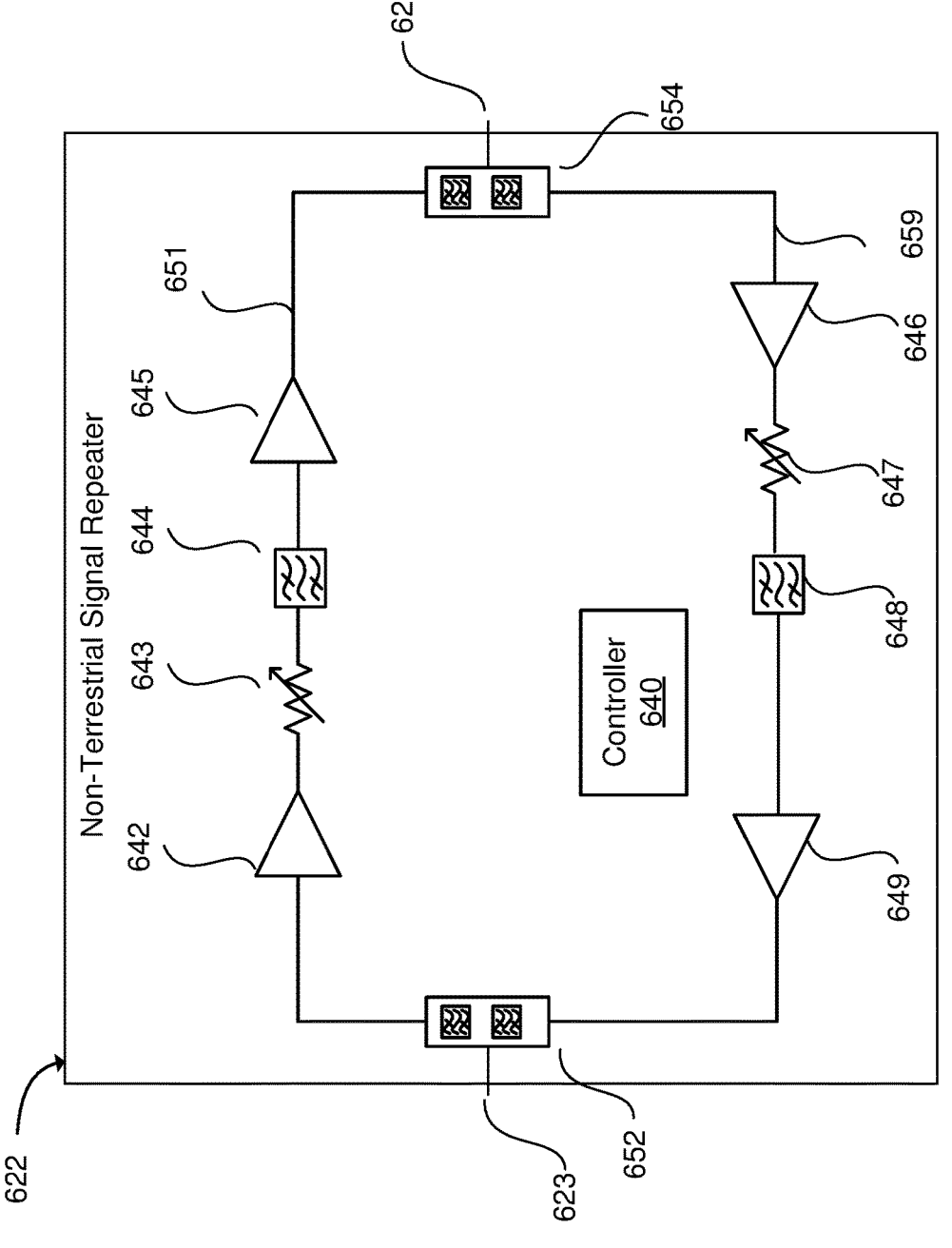
FIG. 6c illustrates a non-terrestrial signal repeater in accordance with an example.

As illustrated in the example of FIG. 6c, the non-terrestrial signal repeater 622 can further comprise a first-direction terrestrial amplification and filtering signal path 651 that is coupled between the non-terrestrial donor port 629 and the non-terrestrial server port 623 of the non-terrestrial signal repeater 622. The first-direction non-terrestrial amplification and filtering signal path 651 can comprise a low noise amplifier (LNA) 642, a variable attenuator 643, a filter 644, and a power amplifier (PA) 645. The LNA 642 can amplify a low power signal with minimal degradation of the signal to noise ratio of the low power signal. The PA 645 can adjust and amplify the power level of the low power signal by a desired amount. A second-direction terrestrial amplification and filtering signal path 659 can be coupled between the non-terrestrial donor port 627 and the non-terrestrial server port 623. The second-direction non-terrestrial amplification and filtering signal path 659 can comprise an LNA 646, a variable attenuator 647, a filter 648, and a PA 649. The first-direction path 651 can be a downlink amplification path or an uplink amplification path. The second-direction path 659 can be a downlink amplification path or an uplink amplification path. The non-terrestrial signal repeater 622 can also be coupled to the controller 640 of FIG. 6a. In one example, the controller 640 can include one or more processors and memory. The first-direction path 651 and the second-direction path 659 can be coupled to the ports 623 and 628 via a duplexer or diplexer 652, 654. A switch, circulator, or splitter may also be used in certain embodiments in place of the duplexer or diplexer. The components (i.e. LNA, PA, filters, and attenuators) used in the first-direction path 651 and the second-direction path 659 of the non-terrestrial signal repeater 622 can be configured to operate at substantially different power levels than the components used in the first-direction path 621 and the second-direction path 619 in the terrestrial signal repeater 620 due to the significantly different pathlengths that the terrestrial and non-terrestrial signals will travel.

Each of the terrestrial signal repeater 620 and the non-terrestrial signal repeater 622 can be governed by different governmental regulations, such as 47 CFR Part 20 for the terrestrial signal repeater 620. The regulations in 47 CFR Part 20 may require a lower power output than is output from the non-terrestrial donor port 627 of the non-terrestrial signal repeater 622. In order to allow the repeater system 600 to meet the requirements of 47 CFR Part 20, the signal power output from the non-terrestrial donor port can be reduced below a threshold power level that meets the requirements of 47 CFR Part 20, or turned off to have substantially no signal output power.

In one embodiment, the repeater system 600 can further comprise a controller 640 configured to activate one of the terrestrial signal repeater 620 or the non-terrestrial signal repeater 622. One of the repeaters can be activated by providing power to the repeater, or turning on one or more active components in the repeater, such as a low noise amplifier, power amplifier, variable attenuator, or other selected component to enable the signal repeater to transmit and receive as designed. In one embodiment, only one of the terrestrial signal repeater 620 or the non-terrestrial signal repeater 622 can be on (i.e. transmitting) at one time. The terrestrial signal repeater 620 can be configured to operate within the limits of a government regulation for cellular communication, such as 47 CFR Part 20 in the United States. The non-terrestrial signal repeater can be configured to operate within the limits of a government regulation for non-terrestrial communication with a terrestrial location. Other governmental regulations can apply in different countries or regions.

In one embodiment, the controller 640 is configured to activate the non-terrestrial signal repeater 622 and deactivate the terrestrial signal repeater 620 when: a downlink non-terrestrial cellular signal or a downlink non-terrestrial signal is received from the orbiting satellite 635 at the non-terrestrial donor port 627 with a signal power greater than a selected threshold; or a downlink non-terrestrial cellular signal is received from the orbiting satellite 635 at the non-terrestrial donor port 627 with a circular polarization; or an uplink non-terrestrial cellular signal or an uplink non-terrestrial signal is received from a user equipment (UE) 610 at the non-terrestrial server port 613 or 663 for communication to the orbiting satellite 635; or the non-terrestrial signal repeater 622 is manually activated; or the controller 640 receives a wireless indication from a UE 610 to activate the non-terrestrial signal repeater 622 to enable the UE 610 to communicate with the orbiting satellite 635 via the repeater system 600.

In one embodiment, the repeater system 600 can further comprise a non-terrestrial donor antenna 631 that is configured to be coupled to the non-terrestrial donor port 627 of the repeater system 600. A terrestrial donor antenna 629 can be configured to be coupled to the terrestrial donor port 629 of the repeater 600 and transmit uplink signals to and receive downlink signals from one or more base stations 630.

The repeater system 600 can further comprise a received power detector 614 and an indicator 611 to indicate when the non-terrestrial cellular signal from the orbiting satellite or the non-terrestrial signal from the orbiting satellite are received with a power greater than a selected threshold to enable a user to position the non-terrestrial donor antenna 631 to receive the non-terrestrial signal or the non-terrestrial cellular signal from the orbiting satellite 635.

In one embodiment of, the non-terrestrial donor antenna 631 can be a wide beamwidth antenna that is configured to transmit to and receive one or more of the non-terrestrial signal or the non-terrestrial cellular signal from the orbiting satellite 635. Alternatively, the non-terrestrial donor antenna 631 can be a narrow beamwidth antenna with a selected beam width and configured to be directed in an upwards direction towards the orbiting satellite 635 to transmit to and receive from one or more of the non-terrestrial signal or the non-terrestrial cellular signal from the orbiting satellite.

In one embodiment, the non-terrestrial donor antenna 631 can be a wide beamwidth antenna. A second non-terrestrial donor antenna 661, configured as a narrow beamwidth antenna, can be coupled to the non-terrestrial donor port 627 via a switch, splitter, duplexer, or diplexer 667. The repeater system 600 can be configured to first receive the non-terrestrial signal or the non-terrestrial cellular signal from the orbiting satellite 635 using the wide beamwidth antenna 631. The controller 640 is configured to then switch to receiving the non-terrestrial signal or the non-terrestrial cellular signal from the orbiting satellite 635 using the narrow beamwidth antenna 661 to increase transmitted power or signal to noise ratio of the non-terrestrial signal or the non-terrestrial cellular signal from the orbiting satellite.

In one embodiment, the wide beamwidth antenna 631 can have a gain of 3 decibels relative to isotropic (dBi). The wide beamwidth antenna 631 can have a beamwidth that is greater than 90 degrees, or 120 degrees. In one embodiment, the beamwidth of the wide beamwidth antenna 631 can be less than or equal to 180 degrees.

In one embodiment, the non-terrestrial donor antenna with the wide beamwidth 631 can be one or more of: a Log periodic antenna, a Horn antenna, a Helix antenna, a Spiral antenna, a Vivaldi antenna, a dome antenna, an omni antenna, or a dipole antenna.

In one embodiment, the non-terrestrial antenna that is the wide beamwidth antenna 631 or the narrow beamwidth antenna 661 is configured to receive a circularly polarized non-terrestrial downlink signal or a circularly polarized non-terrestrial cellular downlink signal from the orbiting satellite 635 and attenuate the terrestrial cellular signal with horizontal plane waves received from terrestrial base stations 630.

In one embodiment, the non-terrestrial antenna that is the narrow beamwidth antenna 661 can be a helical antenna. The non-terrestrial antenna that is the narrow beamwidth antenna 661 can have a beam width that is less than 40 degrees, or less than 30 degrees, or less than or equal to 20 degrees. The non-terrestrial antenna that is the narrow beamwidth antenna 661 can have a gain of greater than 10 decibels relative to isotropic (dBi) or a gain of greater than 20 dBi.

In one embodiment, the non-terrestrial donor antenna with the narrow beamwidth 661 is one or more of a helical antenna, a dish antenna, a log-periodic antenna, a horn antenna, a Yagi antenna, a single element dipole antenna, a loop antenna, or a microstrip patch antenna.

In one embodiment, a server antenna 624 can be configured to be coupled to one or more of the terrestrial server port 613 or the non-terrestrial server port 663. A single server antenna 624 can be used to receive UL signals (i.e.

terrestrial cellular UL signals or non-terrestrial UL signals or non-terrestrial cellular UL signals) from the UE 610 and transmit DL signals (i.e. terrestrial cellular DL signals or non-terrestrial DL signals or non-terrestrial cellular DL signals) to the UE 610. The signals can be routed through a duplexer or diplexer 633. Alternatively, other signal directing components can be used in place of the duplexer or diplexer 633, such as a switch or power splitter/combiner or matching network or circulator. The controller 640 can send a signal to the switch 633 to switch the server antenna between the terrestrial server port 613 or the non-terrestrial server port 663 based on the activation of the terrestrial signal repeater 620 or the non-terrestrial signal repeater 622 by the controller 640.

In another embodiment, the server antenna 624 can be a terrestrial server antenna coupled to the terrestrial signal repeater 620 directly via a terrestrial server port 613 without the additional need for the duplexer/diplexer 633. In this embodiment, a non-terrestrial server antenna 664 can be coupled directly to the non-terrestrial signal repeater 622 via a non-terrestrial server port 663. In one embodiment, the repeater system 600 is configured to continuously scan one or more of a terrestrial cellular uplink signal or a non-terrestrial uplink signal or a non-terrestrial cellular uplink signal received at the server antenna 624.

In one embodiment, the non-terrestrial server antenna 664 can be coupled to the non-terrestrial server port 663 with a first coaxial cable 665 and the terrestrial server antenna 624 is coupled to the terrestrial server port 613 with a second coaxial cable 615. Alternatively, a single coaxial cable 615 can be used to couple the server antenna 624 to a single server port 613.

In one embodiment, the non-terrestrial donor antenna 631 and the terrestrial donor antenna 626 can be communicatively coupled to the terrestrial donor port 629 or the non-terrestrial donor port 627 through a diplexer, a splitter, a switch, a coupler, or an impedance matching circuit.

Figure 6D:
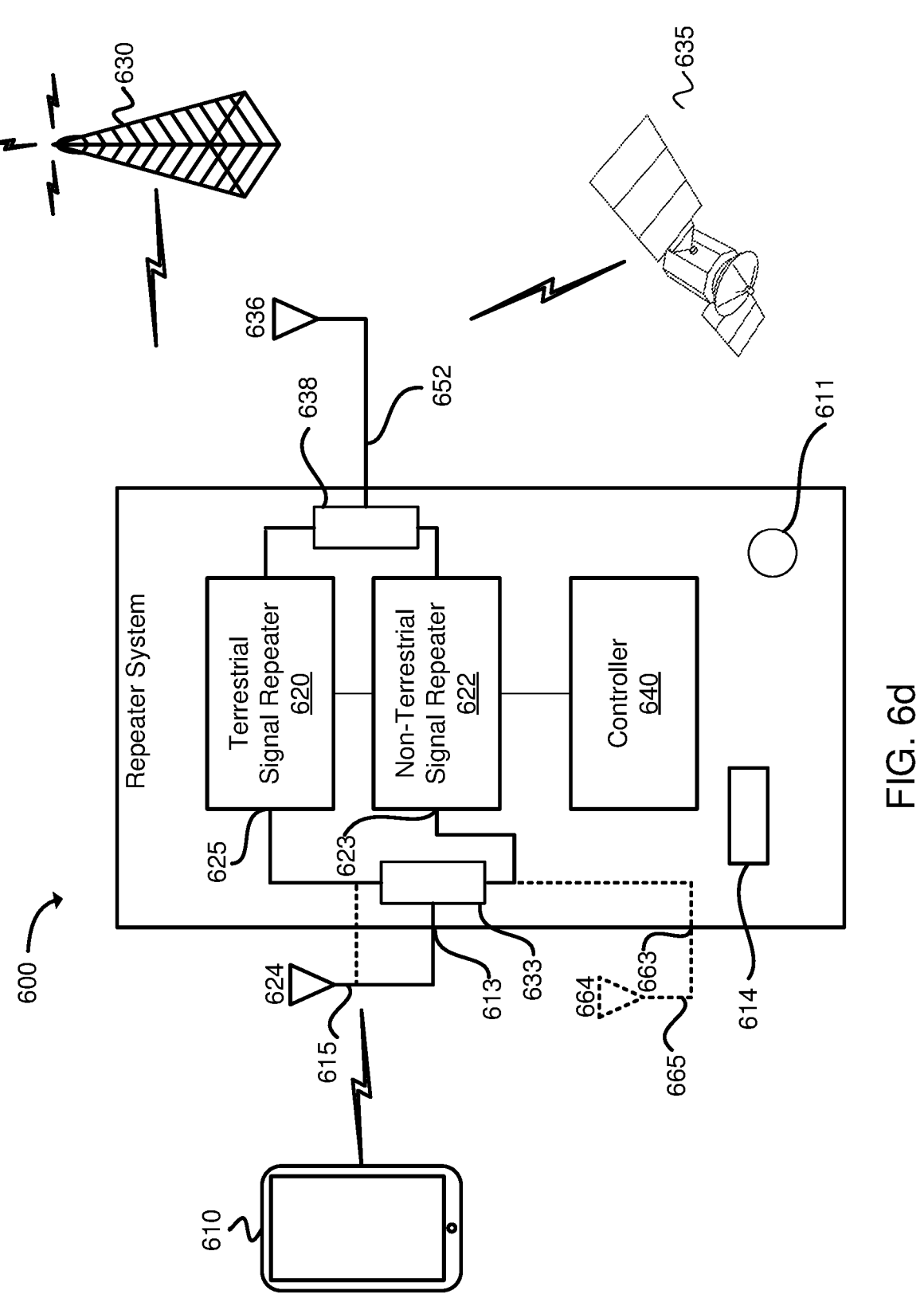
FIG. 6d illustrates the repeater of FIG. 6a with a single donor antenna port in accordance with an example.

In one embodiment, the terrestrial donor antenna 626 and the non-terrestrial donor antenna 631 can be a single donor antenna 636 that is coupled to the terrestrial signal repeater 620 and the non-terrestrial signal repeater 622 via a diplexer, a duplexer, a splitter/combiner, a switch, a coupler, or an impedance matching circuit 638, as shown in the example embodiment illustrated in FIG. 6d.

In one embodiment, the non-terrestrial donor antenna 631 and the terrestrial donor antenna 626 can be coupled to the terrestrial donor port 629 or the non-terrestrial donor port 627 of the repeater system 600 using a common coaxial cable 652 communicatively coupled between non-terrestrial donor antenna and the terrestrial donor antenna and the non-terrestrial donor port or the terrestrial donor port.

In one embodiment, the non-terrestrial donor antenna 631 is coupled to the non-terrestrial donor port 627 with a first coaxial cable 671 and the terrestrial donor antenna 626 is coupled to the terrestrial donor port 629 with a second coaxial cable 675.

In one embodiment, the non-terrestrial donor antenna 631 (or 661) can be a tracking antenna, such as a phased array antenna or a motorized antenna or a motorized or fixed wideband antenna. The phased array antenna can track multiple satellites concurrently using multiple beams directed towards the multiple satellites. The wideband antenna can also be used to track multiple satellites that are within the beam width of the wideband antenna.

In one embodiment, the repeater system 600 can include a wireless transceiver 682, such as a Wi-Fi transceiver or a Bluetooth transceiver, that is configured to receive an orientation of a user equipment 610 that is directed towards the orbiting satellite 635 and use the orientation of the UE 610 to direct the tracking antenna 631 (or 661) towards the orbiting satellite 635. In another embodiment, the wireless transceiver 682, such as the Wi-Fi transceiver or the Bluetooth transceiver, is configured to receive a location of the orbiting satellite 635 from a user equipment 610 and use the location to direct the tracking antenna 631 (or 661) towards the location of the orbiting satellite 635.

In one embodiment, the controller 640 is configured to measure a power level of the terrestrial cellular signal received at the terrestrial donor port 629 and adjust uplink power transmissions, uplink noise power transmissions, or uplink signal path gain on the second-direction terrestrial amplification and filtering signal path 619 based on the power level of the received terrestrial cellular signal.

In another embodiment, the controller 640 is configured to measure a power level of a non-terrestrial downlink signal or a non-terrestrial cellular downlink signal received at the non-terrestrial donor port 627 in one or more cellular frequency bands or satellite frequency bands and adjust uplink power transmissions on the non-terrestrial first direction amplification and filtering path 651 or the non-terrestrial second direction amplification and filtering path 659 based on the power level, for transmission from the non-terrestrial donor port 627 to the orbiting satellite 635 via the non-terrestrial donor antenna 631 (or 661).

In one embodiment, the uplink gain level of the selected sub-band in the non-terrestrial uplink signal or the non-terrestrial cellular uplink signal is greater than a gain level allowed by a governmental agency for a transmission of a terrestrial cellular uplink signal by the terrestrial signal repeater 620.

In one embodiment, the first-direction 651 and second-direction 659 non-terrestrial signal amplification and filtering paths (FIG. 6c) each include one or more analog or digital filters to limit a bandwidth of the uplink signal to the selected sub-band.

EXAMPLES

The following examples pertain to specific technology embodiments and point out specific features, elements, or actions that can be used or otherwise combined in achieving such embodiments.

Example 1 includes a cellular repeater system for terrestrial and non-terrestrial signals, comprising: a cellular repeater comprising: a donor port; a server port; a first-direction amplification and filtering signal path coupled between the donor port and the server port; a second-direction amplification and filtering signal path coupled between the donor port and the server port; and a donor antenna configured to be coupled to the donor port of the cellular repeater, wherein the donor antenna is a fixed direction, wide beamwidth antenna configured to receive signals from both terrestrial based cellular base stations and from an orbiting satellite.

Example 2 includes the cellular repeater system of Example 1, wherein the donor antenna is further configured to receive non-terrestrial signals in one or more cellular frequency bands or one or more non-terrestrial frequency bands from the orbiting satellite.

Example 3 includes the cellular repeater system of Example 1, wherein the cellular repeater system further comprises a received power detector and an indicator to indicate when the cellular signals from the orbiting satellite are received with a power greater than a selected threshold to enable a user to position the donor antenna to receive the cellular signals from the orbiting satellite.

Example 4 includes the cellular repeater system of Example 3, wherein the donor antenna further comprises a battery power source or a solar panel power source to power the received power detector and the indicator.

Example 5 includes the cellular repeater system of Example 1, wherein the donor antenna has a gain of 3 decibels relative to isotropic (dBi).

Example 6 includes the cellular repeater system of Example 1, wherein the donor antenna has a beamwidth of greater than 90 degrees.

Example 7 includes the cellular repeater system of Example 1, wherein the donor antenna has a beamwidth of greater than 120 degrees.

Example 8 includes the cellular repeater system of Example 1, wherein the donor antenna has a beamwidth of greater than 150 degrees.

Example 9 includes the cellular repeater system of Example 1, wherein the donor antenna has a beamwidth of greater than or equal to 180 degrees Example 10 includes the cellular repeater system of Example 1, wherein the donor antenna is comprised of two or more antennas, communicatively coupled to the donor port through a diplexer, a splitter, a switch, a coupler, or an impedance matching circuit.

Example 11 includes the cellular repeater system of Example 10, wherein the two or more antennas are coupled to the donor port of the cellular repeater using a common coaxial cable communicatively coupled between the two or more antennas and the donor port.

Example 12 includes the cellular repeater system of Example 1, wherein the donor antenna is comprised of two or more independent donor antennas, with each donor antenna having an independent coaxial cable coupled between the donor antenna and one or more donor ports at the repeater.

Example 13 includes the cellular repeater system of Example 10, further comprising a server antenna configured to be coupled to the server port.

Example 14 includes the cellular repeater system of Example 13, further comprising a single coaxial cable coupled between the server antenna and the server port.

Example 15 includes the cellular repeater system of Example 1, wherein the donor antenna with the wide beamwidth is selected from one or more of: a Log periodic antenna, a Horn antenna, a Helix antenna, a Spiral antenna, a Vivaldi antenna, a dome antenna, an omni antenna, or a dipole antenna.

Example 16 includes a cellular and non-terrestrial signal repeater system, comprising: a cellular and non-terrestrial signal repeater, comprising: a donor port; a server port; a controller; one or more of: a terrestrial signal amplification and filtering path coupled between the donor port and the server port; or a non-terrestrial signal amplification and filtering path coupled between the donor port and the server port configured to filter and amplify non-terrestrial signals; and a terrestrial donor antenna configured to be coupled to the donor port; and a non-terrestrial donor antenna configured to be coupled to the donor port, wherein the non-terrestrial donor antenna is a narrow beamwidth antenna with a selected beam width and configured to be directed in an upwards direction towards an orbiting satellite Example 17 includes the cellular and non-terrestrial signal repeater system of Example 16, further comprising a server antenna configured to be coupled to the server port and configured to transmit the non-terrestrial signals to a user equipment (UE) and receive an uplink signal from the UE for transmission to a satellite via the non-terrestrial donor antenna.

Example 18 includes the cellular and non-terrestrial signal repeater system of Example 16, further comprising a diplexer, combiner, switch, coupler or matching network coupled to the terrestrial donor antenna and the non-terrestrial donor antenna and the donor port.

Example 19 includes the cellular and non-terrestrial signal repeater system of Example 16, wherein the non-terrestrial donor antenna is configured to receive circularly polarized non-terrestrial signals from the orbiting satellite and attenuate horizontal plane waves from terrestrial base stations.

Example 20 includes the cellular and non-terrestrial signal repeater system of Example 16, wherein the non-terrestrial donor antenna is a helical antenna.

Example 21 includes the cellular and non-terrestrial signal repeater system of Example 16, further comprising a switch coupled to the terrestrial donor antenna and the non-terrestrial donor antenna and the donor port.

Example 22 includes the cellular and non-terrestrial signal repeater system of Example 16, wherein the selected beam width is less than 40 degrees.

Example 23 includes the cellular and non-terrestrial signal repeater system of Example 16, wherein the selected beam width is less than 30 degrees.

Example 24 includes the cellular and non-terrestrial signal repeater system of Example 16, wherein the selected beam width is less than or equal to degrees.

Example 25 includes the cellular and non-terrestrial signal repeater system of Example 16, wherein the non-terrestrial donor antenna has a gain of greater than 10 decibels relative to isotropic (dBi).

Example 26 includes the cellular and non-terrestrial signal repeater system of Example 16, wherein the non-terrestrial donor antenna has a gain of greater than 20 decibels relative to isotropic (dBi).

Example 27 includes the cellular and non-terrestrial signal repeater system of Example 16, wherein the non-terrestrial donor antenna is configured to receive cellular signals in one or more cellular frequency bands from the orbiting satellite.

Example 28 includes the cellular and non-terrestrial signal repeater system of Example 16, wherein the non-terrestrial donor antenna is fixed in a specific direction and orientation.

Example 29 includes the cellular and non-terrestrial signal repeater system of Example 16, wherein the non-terrestrial donor antenna is a tracking antenna.

Example 30 includes the cellular and non-terrestrial signal repeater system of Example 29, wherein the tracking antenna is a phased array antenna.

Example 31 includes the cellular and non-terrestrial signal repeater system of Example 16, wherein the non-terrestrial donor antenna with the narrow beamwidth is one or more of a helical antenna, a dish antenna, a log-periodic antenna, a horn antenna, a Yagi antenna, a single element dipole antenna, a loop antenna, or a microstrip patch antenna.

Example 32 includes a cellular and non-terrestrial signal repeater system, comprising: a cellular and non-terrestrial signal repeater, comprising: a donor port; a server port; a controller; one or more of: a terrestrial signal amplification and filtering path coupled between the donor port and the server port; or a non-terrestrial signal amplification and filtering path coupled between the donor port and the server port configured to filter and amplify non-terrestrial signals; and a terrestrial donor antenna configured to be coupled to the donor port; and a non-terrestrial donor antenna configured to be coupled to the donor port, wherein the non-terrestrial donor antenna is a narrow beamwidth antenna with a selected beam width and configured to be directed in an upwards direction towards an orbiting satellite.

Example 33 includes the cellular and non-terrestrial signal repeater system of Example 32, wherein the non-terrestrial donor antenna is configured to receive cellular signals in one or more cellular. frequency bands from the orbiting satellite.

Example 34 includes the cellular and non-terrestrial signal repeater system of Example 33, wherein the controller is configured to measure a power level of downlink signals received on the terrestrial donor antenna that are in the one or more cellular frequency bands and adjust uplink power transmissions, uplink noise power transmissions, or uplink signal path gain on the non-terrestrial signal amplification and filtering path based on the terrestrial signal received power level.

Example 35 includes the cellular and non-terrestrial signal repeater system of Example 33, wherein the controller is configured to measure a power level of uplink signals received at the repeater in the one or more cellular frequency bands and adjust uplink power transmissions on the non-terrestrial signal amplification and filtering path based on the power level.

Example 36 includes the cellular and non-terrestrial signal repeater system of Example 33, wherein the controller is configured to set an uplink gain level for an uplink signal on the non-terrestrial signal amplification and filtering path for a selected sub-band of the uplink signal within the one or more cellular frequency bands, wherein the selected sub-band is used for communicating the uplink signal to the orbiting satellite via the non-terrestrial donor antenna.

Example 37 includes the cellular and non-terrestrial signal repeater system of Example 36, wherein the uplink gain level of the selected sub-band in the uplink signal is greater than a gain level allowed by a governmental agency for a transmission of cellular uplink signals by a repeater.

Example 38 includes the cellular and non-terrestrial signal repeater system of Example 36, wherein the non-terrestrial signal amplification and filtering path includes one or more analog or digital filters to limit a bandwidth of the uplink signal to the selected sub-band.

Example 39 includes a repeater system for repeating terrestrial and non-terrestrial signals, comprising: a terrestrial signal repeater comprising: a terrestrial donor port configured to receive cellular signals from and transmit cellular signals to a base station; a terrestrial server port; a first-direction terrestrial amplification and filtering signal path coupled between the terrestrial donor port and the terrestrial server port; and a non-terrestrial signal repeater comprising: a non-terrestrial donor port configured to receive a terrestrial cellular signal from a base station or a non-terrestrial signal or a non-terrestrial cellular signal from an orbiting satellite; a non-terrestrial server port; a first-direction non-terrestrial amplification and filtering signal path coupled between the non-terrestrial donor port and the non-terrestrial server port.

Example 40 includes the repeater system of Example 39, further comprising a controller configured to activate one of the terrestrial signal repeater or the non-terrestrial signal repeater.

Example 41 includes the repeater system of Example 41, wherein the controller is configured to activate the non-terrestrial signal repeater and deactivate the terrestrial signal repeater when: a downlink non-terrestrial cellular signal or a downlink non-terrestrial signal is received from the orbiting satellite at the non-terrestrial donor port with a signal power greater than a selected threshold; or a downlink non-terrestrial cellular signal is received from the orbiting satellite at the non-terrestrial donor port with a circular polarization; an uplink non-terrestrial cellular signal or an uplink non-terrestrial signal is received from a user equipment (UE) at a non-terrestrial server port for communication to the orbiting satellite; or the non-terrestrial signal repeater is manually activated; or the controller receives a wireless indication from a UE to activate the non-terrestrial signal repeater to enable the UE to communicate with the orbiting satellite via the repeater system Example 42 includes the repeater system of Example 41, wherein the terrestrial signal repeater is configured to operate within the limits of a government regulation for cellular communication.

Example 43 includes the repeater system of Example 41, wherein the non-terrestrial signal repeater is configured to operate within the limits of a government regulation for non-terrestrial communication.

Example 44 includes the repeater system of Example 1, further comprising: a non-terrestrial donor antenna configured to be coupled to the non-terrestrial donor port of the repeater; and a terrestrial donor antenna configured to be coupled to the terrestrial donor port of the repeater and transmit uplink signals to and receive downlink signals from one or more base stations.

Example 45 includes the repeater system of Example 46, wherein the repeater system further comprises a received power detector and an indicator to indicate when the non-terrestrial cellular signal from the orbiting satellite or the non-terrestrial signal from the orbiting satellite are received with a power greater than a selected threshold to enable a user to position the non-terrestrial donor antenna to receive the non-terrestrial signal or the non-terrestrial cellular signal from the orbiting satellite.

Example 46 includes the repeater system of Example 46, wherein: the non-terrestrial donor antenna is a fixed direction, wide beamwidth antenna configured to transmit to and receive one or more of the non-terrestrial signal or the non-terrestrial cellular signal from the orbiting satellite; or the non-terrestrial donor antenna is a narrow beamwidth antenna with a selected beam width and configured to be directed in an upwards direction towards the orbiting satellite to transmit to and receive one or more of the non-terrestrial signal or the non-terrestrial cellular signal from the orbiting satellite.

Example 47 includes the repeater system of Example 48, wherein the repeater system is configured to first receive the non-terrestrial signal or the non-terrestrial cellular signal from the orbiting satellite using the wide beamwidth antenna, and then the controller is configured to switch to using the narrow beamwidth antenna to receive the non-terrestrial signal or the non-terrestrial cellular signal to increase transmitted power or signal to noise ratio of the non-terrestrial signal or the non-terrestrial cellular signal from the orbiting satellite.

Example 48 includes the repeater system of Example 1, further comprising: a second-direction terrestrial amplification and filtering signal path coupled between the terrestrial donor port and the terrestrial server port.

Example 49 includes the repeater system of Example 46, further comprising: a second-direction non-terrestrial amplification and filtering signal path coupled between the non-terrestrial donor port and the non-terrestrial server port.

Example 50 includes the repeater system of Example 41, further comprising a server antenna configured to be coupled to one or more of the terrestrial server port or a non-terrestrial server port.

Example 51 includes the repeater system of Example 53, wherein the repeater system is configured to continuously scan one or more of a terrestrial cellular uplink signal or a non-terrestrial uplink signal or a non-terrestrial cellular uplink signal received at the server antenna.

Example 52 includes the repeater system of Example 53, further comprising a switch configured to switch the server antenna between the terrestrial server port or the non-terrestrial server port based on the activation by the controller.

Example 53 includes the repeater system of Example 50, further comprising: a non-terrestrial server antenna configured to be coupled to the non-terrestrial server port of the repeater; and a terrestrial server antenna configured to be coupled to the terrestrial server port of the repeater and transmit downlink signals to and receive uplink signals from one or more user equipment (UEs).

Example 54 includes the repeater system of Example 56, wherein the repeater system is configured to continuously scan one or more of: a terrestrial cellular uplink signal received at the terrestrial server antenna; or a non-terrestrial uplink signal or a non-terrestrial cellular uplink signal received at the non-terrestrial server antenna.

Example 55 includes the repeater system of Example 56, wherein the non-terrestrial server antenna is coupled to the non-terrestrial server port with a first coaxial cable and the terrestrial server antenna is coupled to the terrestrial server port with a second coaxial cable.

Example 56 includes the repeater system of Example 48, wherein the fixed direction wide beamwidth antenna has a gain of 3 decibels relative to isotropic (dBi).

Example 57 includes the repeater system of Example 48, wherein the fixed direction wide beamwidth antenna has a beamwidth of greater than 90 degrees.

Example 58 includes the repeater system of Example 48, wherein the fixed direction wide beamwidth antenna has a beamwidth of greater than 120 degrees.

Example 59 includes the repeater system of Example 48, wherein the fixed direction wide beamwidth antenna has a beamwidth of greater than 150 degrees.

Example 60 includes the repeater system of Example 48, wherein the fixed direction wide beamwidth antenna has a beamwidth of greater than or equal to 180 degrees.

Example 61 includes the repeater system of Example 46, wherein the non-terrestrial donor antenna and the terrestrial donor antenna are communicatively coupled to the terrestrial donor port or the non-terrestrial donor port through a diplexer, a splitter, a switch, a coupler, or an impedance matching circuit.

Example 62 includes the repeater system of Example 10, wherein the non-terrestrial donor antenna and the terrestrial donor antenna are coupled to the terrestrial donor port or the non-terrestrial donor port of the repeater system using a common coaxial cable communicatively coupled between non-terrestrial donor antenna and the terrestrial donor antenna and the non-terrestrial donor port or the terrestrial donor port.

Example 63 includes the repeater system of Example 65, wherein the non-terrestrial donor antenna and the terrestrial donor antenna are a single antenna.

Example 64 includes the repeater system of Example 46, wherein the non-terrestrial donor antenna is coupled to the non-terrestrial donor port with a first coaxial cable and the terrestrial donor antenna is coupled to the terrestrial donor port with a second coaxial cable.

Example 65 includes the repeater system of Example 48, wherein the non-terrestrial donor antenna with the wide beamwidth is selected from one or more of: a Log periodic antenna, a Horn antenna, a Helix antenna, a Spiral antenna, a Vivaldi antenna, a dome antenna, an omni antenna, or a dipole antenna.

Example 66 includes the repeater system of Example 48, wherein the non-terrestrial antenna that is the wide beamwidth antenna or the narrow beamwidth antenna is configured to receive a circularly polarized non-terrestrial downlink signal or a circularly polarized non-terrestrial cellular downlink signal from the orbiting satellite and attenuate the terrestrial cellular signal with horizontal plane waves received from terrestrial base stations.

Example 67 includes the repeater system of Example 48, wherein the narrow beamwidth antenna is a helical antenna.

Example 68 includes the repeater system of Example 48, wherein the selected beam width is less than 40 degrees.

Example 69 includes the repeater system of Example 48, wherein the selected beam width is less than 30 degrees.

Example 70 includes the repeater system of Example 48, wherein the selected beam width is less than or equal to 20 degrees.

Example 71 includes the repeater system of Example 48, wherein the narrow beamwidth antenna has a gain of greater than 10 decibels relative to isotropic (dBi).

Example 72 includes the repeater system of Example 48, wherein the narrow beamwidth antenna has a gain of greater than 20 decibels relative to isotropic (dBi).

Example 73 includes the repeater system of Example 46, wherein the non-terrestrial donor antenna is a tracking antenna.

Example 74 includes the repeater system of Example 76, further comprising a Wi-Fi transceiver or a Bluetooth transceiver configured to receive an orientation of a user equipment that is directed towards the orbiting satellite and use the orientation to direct the tracking antenna towards the orbiting satellite.

Example 75 includes the repeater system of Example 76, further comprising a Wi-Fi transceiver or a Bluetooth transceiver configured to receive a location of the orbiting satellite from a user equipment and use the location to direct the tracking antenna towards the location of the orbiting satellite.

Example 76 includes the repeater of Example 76, wherein the tracking antenna is a phased array antenna.

Example 77 includes the repeater system of Example 48, wherein the non-terrestrial donor antenna with the narrow beamwidth is one or more of a helical antenna, a dish antenna, a log-periodic antenna, a horn antenna, a Yagi antenna, a single element dipole antenna, a loop antenna, or a microstrip patch antenna.

Example 78 includes the repeater system of Example 41, wherein the controller is configured to measure a power level of the terrestrial cellular signal received at the terrestrial donor port and adjust uplink power transmissions, uplink noise power transmissions, or uplink signal path gain on the second-direction terrestrial amplification and filtering signal path based on the power level of the received terrestrial cellular signal.

Example 79 includes the repeater system of Example 46, wherein the controller is configured to measure a power level of a non-terrestrial downlink signal or a non-terrestrial cellular downlink signal received at the non-terrestrial donor port in one or more cellular frequency bands or satellite frequency bands and adjust uplink power transmissions on the non-terrestrial first direction amplification and filtering path or the non-terrestrial second direction amplification and filtering path based on the power level, for transmission from the non-terrestrial donor port to the orbiting satellite via the non-terrestrial donor antenna.

Example 80 includes the repeater system of Example 46, wherein the controller is configured to set an uplink gain level for a non-terrestrial uplink signal or a non-terrestrial cellular uplink signal on the first-direction or the second-direction non-terrestrial amplification and filtering signal path for a selected sub-band within one or more cellular frequency bands or satellite frequency bands, wherein the selected sub-band is used for communicating the non-terrestrial uplink signal or the non-terrestrial cellular uplink signal to the orbiting satellite via the non-terrestrial donor antenna.

Example 81 includes the repeater system of Example 84, wherein the uplink gain level of the selected sub-band in the non-terrestrial uplink signal or the non-terrestrial cellular uplink signal is greater than a gain level allowed by a governmental agency for a transmission of a terrestrial uplink signal by the terrestrial signal repeater.

Example 82 includes the repeater system of Example 84, wherein the first-direction and second-direction non-terrestrial signal amplification and filtering path each include one or more analog or digital filters to limit a bandwidth of the uplink signal to the selected sub-band.

Example 83 includes a terrestrial-based non-terrestrial network signal repeater, comprising: a donor port configured to receive a non-terrestrial signal or a non-terrestrial cellular signal from an orbiting satellite; a server port; a first-direction amplification and filtering signal path coupled between the donor port and the server port; and a second-direction amplification and filtering signal path coupled between the server port and the donor port; and a controller.

Example 84 includes the terrestrial-based non-terrestrial network signal repeater of Example 87, further comprising: a donor antenna configured to be coupled to the donor port of the repeater and configured to receive the non-terrestrial signal or the non-terrestrial cellular signal from the orbiting satellite and communicate the non-terrestrial signal or the non-terrestrial cellular signal to the donor port.

Example 85 includes the terrestrial-based non-terrestrial network signal repeater of Example 88, wherein: the donor antenna is a fixed direction, wide beamwidth antenna configured to transmit to and receive one or more of the non-terrestrial signal or the non-terrestrial cellular signal from the orbiting satellite; or the donor antenna is a narrow beamwidth antenna with a selected beam width and configured to be directed in an upwards direction towards the orbiting satellite to transmit to and receive one or more of the non-terrestrial signal or the non-terrestrial cellular signal from the orbiting satellite.

Example 86 includes the terrestrial-based non-terrestrial network signal repeater of Example 89, further configured to: first receive the non-terrestrial signal or the non-terrestrial cellular signal from the orbiting satellite using the wide beamwidth antenna; and second, switch, using the controller, to receive the non-terrestrial signal or the non-terrestrial cellular signal from the orbiting satellite using the narrow beamwidth antenna to increase transmitted power or signal to noise ratio of the non-terrestrial signal or the non-terrestrial cellular signal from the orbiting satellite.

Example 87 includes the terrestrial-based non-terrestrial network signal repeater of Example 88, wherein the donor antenna is a tracking antenna.

Example 88 includes the terrestrial-based non-terrestrial network signal repeater of Example 91, further comprising a Bluetooth transceiver or a Wi-Fi transceiver configured to receive an orientation of a user equipment that is directed towards the orbiting satellite and use the orientation to direct the tracking antenna towards the orbiting satellite.

Example 89 includes the terrestrial-based non-terrestrial network signal repeater of Example 91, further comprising a Bluetooth transceiver or a Wi-Fi transceiver configured to receive a location of the orbiting satellite from a user equipment and use the location to direct the tracking antenna towards the location of the orbiting satellite.

Example 90 includes the terrestrial-based non-terrestrial network signal repeater of Example 91, wherein the tracking antenna is a phased array antenna.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object-oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A cellular repeater system for terrestrial and non-terrestrial signals, comprising:

a cellular repeater comprising:

a donor port;

a server port;

a first-direction amplification and filtering signal path coupled between the donor port and the server port; and a second-direction amplification and filtering signal path coupled between the donor port and the server port; and a donor antenna configured to be coupled to the donor port of the cellular repeater, wherein the donor antenna is a fixed direction, wide beamwidth antenna configured to receive signals from both terrestrial based cellular base stations and from an orbiting satellite, wherein the donor antenna is further configured to receive non-terrestrial signals in one or more cellular frequency bands or one or more non-terrestrial frequency bands from the orbiting satellite; and a power detector to indicate a direction at which the non-terrestrial signals from the orbiting satellite are received with a power level greater than a selected threshold to electronically steer or physically position the donor antenna to receive the non-terrestrial signals from the orbiting satellite or transmit signals to the orbiting satellite.

2. The cellular repeater system of claim 1, wherein the cellular repeater system further comprises the received power detector and an indicator to indicate when the non-terrestrial signals from the orbiting satellite are received with a power greater than the selected threshold to enable a user to position the donor antenna to receive the cellular non-terrestrial signals from the orbiting satellite.

3. The cellular repeater system of claim 2, wherein the donor antenna further comprises a battery power source or a solar panel power source to power the received power detector and the indicator.

4. The cellular repeater system of claim 1, wherein the donor antenna has a gain of 3 decibels relative to isotropic (dBi).

5. The cellular repeater system of claim 1, wherein the donor antenna has a beamwidth of greater than 90 degrees.

6. The cellular repeater system of claim 1, wherein the donor antenna has a beamwidth of greater than 120 degrees.

7. The cellular repeater system of claim 1, wherein the donor antenna has a beamwidth of greater than 150 degrees.

8. The cellular repeater system of claim 1, wherein the donor antenna has a beamwidth of greater than or equal to 180 degrees.

9. The cellular repeater system of claim 1, wherein the donor antenna is comprised of two or more antennas, communicatively coupled to the donor port through a diplexer, a splitter, a switch, a coupler, or an impedance matching circuit.

10. The cellular repeater system of claim 9, wherein the two or more antennas are coupled to the donor port of the cellular repeater using a common coaxial cable communicatively coupled between the two or more antennas and the donor port.

11. The cellular repeater system of claim 1, wherein the donor antenna is comprised of two or more independent donor antennas, with each donor antenna having an independent coaxial cable coupled between the donor antenna and one or more donor ports at the repeater.

12. The cellular repeater system of claim 9, further comprising a server antenna configured to be coupled to the server port.

13. The cellular repeater system of claim 12, further comprising a single coaxial cable coupled between the server antenna and the server port.

14. The cellular repeater system of claim 1, wherein the donor antenna with the wide beamwidth is selected from one or more of: a Log periodic antenna, a Horn antenna, a Helix antenna, a Spiral antenna, a Vivaldi antenna, a dome antenna, an omni antenna, or a dipole antenna.

15. A cellular and non-terrestrial signal repeater system, comprising:

a cellular and non-terrestrial signal repeater, comprising:

a donor port;

a server port;

a controller;

one or more of:

a terrestrial signal amplification and filtering path coupled between the donor port and the server port; or a non-terrestrial signal amplification and filtering path coupled between the donor port and the server port configured to filter and amplify non-terrestrial signals;

a terrestrial donor antenna configured to be coupled to the donor port;

a non-terrestrial donor antenna configured to be coupled to the donor port, wherein the non-terrestrial donor antenna is a narrow beamwidth antenna with a selected beam width and configured to be directed in an upwards direction towards an orbiting satellite wherein the non-terrestrial donor antenna is further configured to receive non-terrestrial signals in one or more cellular frequency bands or one or more non-terrestrial frequency bands from the orbiting satellite; and a power detector to indicate a direction at which the non-terrestrial signals from the orbiting satellite are received with a power level greater than a selected threshold to electronically steer or physically position the non-terrestrial donor antenna to receive the non-terrestrial signals from the orbiting satellite or transmit signals to the orbiting satellite.

16. The cellular and non-terrestrial signal repeater system of claim 15, wherein the controller is configured to measure a power level of downlink signals received on the terrestrial donor antenna that are in the one or more cellular frequency bands and adjust uplink power transmissions, uplink noise power transmissions, or uplink signal path gain on the non-terrestrial signal amplification and filtering path based on the terrestrial signal received power level.

17. The cellular and non-terrestrial signal repeater system of claim 15, wherein the controller is configured to measure a power level of uplink signals received at the repeater in the one or more cellular frequency bands and adjust uplink power transmissions on the non-terrestrial signal amplification and filtering path based on the power level.

18. The cellular and non-terrestrial signal repeater system of claim 15, wherein the controller is configured to set an uplink gain level for an uplink signal on the non-terrestrial signal amplification and filtering path for a selected sub-band of the uplink signal within the one or more cellular frequency bands, wherein the selected sub-band is used for communicating the uplink signal to the orbiting satellite via the non-terrestrial donor antenna.

19. The cellular and non-terrestrial signal repeater system of claim 18, wherein the uplink gain level of the selected sub-band in the uplink signal is greater than a gain level allowed by a governmental agency for a transmission of cellular uplink signals by a repeater.

20. The cellular and non-terrestrial signal repeater system of claim 18, wherein the non-terrestrial signal amplification and filtering path includes one or more analog or digital filters to limit a bandwidth of the uplink signal to the selected sub-band.

21. The cellular repeater system of claim 1, wherein the donor antenna is a tracking antenna.

22. The cellular repeater system of claim 21, further comprising a Bluetooth transceiver or a Wi-Fi transceiver configured to receive an orientation of a user equipment that is directed towards the orbiting satellite and use the orientation to direct the tracking antenna towards the orbiting satellite.

23. The cellular repeater system of claim 21, further comprising a Bluetooth transceiver or a Wi-Fi transceiver configured to receive a location of the orbiting satellite from a user equipment and use the location to direct the tracking antenna towards the location of the orbiting satellite.

24. The cellular repeater system of claim 1, wherein the donor antenna is a phased array antenna and configured to be electronically steered to maximize a power of the received non-terrestrial signals at the donor antenna from the orbiting satellite and direct the donor antenna towards a location of the orbiting satellite to transmit signals.

25. The cellular repeater system of claim 24, wherein the donor antenna is the phased array antenna and configured to be electronically steered based on the power level of the received non-terrestrial signals from the power detector.

26. The cellular repeater system of claim 1, wherein the donor antenna is configured to be physically steered by a user or a motor to maximize a power of the received non-terrestrial signals and direct the donor antenna towards a location of the orbiting satellite to transmit signals.

27. The cellular system of claim 26, wherein the donor antenna is configured to be physically steered by the user or the motor towards the location of the orbiting satellite based on the power level of the received non-terrestrial signals from the power detector.

28. The cellular and non-terrestrial signal repeater system of claim 15, wherein the non-terrestrial donor antenna is a tracking antenna.

29. The cellular and non-terrestrial signal repeater system of claim 28, further comprising a Bluetooth transceiver or a Wi-Fi transceiver configured to receive an orientation of a user equipment that is directed towards the orbiting satellite and use the orientation to direct the tracking antenna towards the orbiting satellite.

30. The cellular and non-terrestrial signal repeater system of claim 28, further comprising a Bluetooth transceiver or a Wi-Fi transceiver configured to receive a location of the orbiting satellite from a user equipment and use the location to direct the tracking antenna towards the location of the orbiting satellite.

31. The cellular and non-terrestrial signal repeater system of claim 15, wherein the non-terrestrial donor antenna is a phased array antenna and configured to be electronically steered to maximize a power of the received non-terrestrial signals at the non-terrestrial donor antenna from the orbiting satellite and direct the non-terrestrial donor antenna towards a location of the orbiting satellite to transmit signals.

32. The cellular and non-terrestrial signal repeater system of claim 31, wherein the non-terrestrial donor antenna is the phased array antenna and configured to be electronically steered based on the power level of the received non-terrestrial signals from the power detector.

33. The cellular and non-terrestrial signal repeater system of claim 15, wherein the non-terrestrial donor antenna is configured to be physically steered by a user or a motor to maximize a power of the received non-terrestrial signals and direct the non-terrestrial donor antenna towards a location of the orbiting satellite to transmit signals.

34. The cellular and non-terrestrial signal repeater system of claim 33, wherein the non-terrestrial donor antenna is configured to be physically steered by the user or the motor towards the location of the orbiting satellite based on the power level of the received non-terrestrial signals from the power detector.

* * * * *